(12) United States Patent
Kim et al.

(10) Patent No.: US 9,673,949 B2
(45) Date of Patent: Jun. 6, 2017

(54) FILTER BANK-BASED CHANNEL STATE REPORT AND RESOURCE ALLOCATION METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Chanhong Kim, Hwaseong-si (KR); Taeyoung Kim, Seoul (KR); Yeohun Yun, Hwaseong-si (KR); Ka Ming Ho, Suwon-si (KR); Kyeongyeon Kim, Hwaseong-si (KR); Jiyun Seol, Seongnam-si (KR); Byunghwan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 14/851,342

(22) Filed: Sep. 11, 2015

(65) Prior Publication Data
US 2016/0080961 A1 Mar. 17, 2016

(30) Foreign Application Priority Data
Sep. 12, 2014 (KR) .......................... 10-2014-0121314

(51) Int. Cl.
*H04W 24/10* (2009.01)
*H04L 5/00* (2006.01)
(Continued)

(52) U.S. Cl.
CPC ............ *H04L 5/0048* (2013.01); *H04L 5/006* (2013.01); *H04L 5/0085* (2013.01);
(Continued)

(58) Field of Classification Search
USPC ....................................................... 370/252
See application file for complete search history.

(56) References Cited

U.S. PATENT DOCUMENTS 7,526,051 B1    4/2009  Beidas et al.
9,210,000 B2 *  12/2015 Dore .................. H04L 25/0204
(Continued)

FOREIGN PATENT DOCUMENTS

WO    2014-021666 A1    2/2014

OTHER PUBLICATIONS

Zakaria, On maximum likelihood Mimo Detection in QAM-FBMC system, 2010, IEEE, pp. 183-187.*
(Continued)

*Primary Examiner* — Kouroush Mohebbi
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A filter bank-based channel state report and resource allocation method and an apparatus for use in a wireless communication system are provided. The channel state report method of a receiver in a filter bank-based wireless communication system includes receiving filter bank information on at least two filter banks from a transmitter, measuring a channel state of the each of at least two filter banks based on the filter bank information, and transmitting channel state information, which is generated based on the measurement result, to the transmitter.

24 Claims, 17 Drawing Sheets

(51) Int. Cl.
*H04W 24/08* (2009.01)
*H04L 27/26* (2006.01)
*H04W 72/08* (2009.01)

(52) U.S. Cl.
CPC .......... *H04L 5/0094* (2013.01); *H04L 27/264* (2013.01); *H04L 27/2646* (2013.01); *H04W 24/08* (2013.01); *H04L 5/0035* (2013.01); *H04L 5/0037* (2013.01); *H04W 72/085* (2013.01)

(56) References Cited

U.S. PATENT DOCUMENTS

| | | |
|---|---|---|
| 2005/0265436 A1 | 12/2005 | Suh et al. |
| 2013/0286959 A1* | 10/2013 | Lou ................ H04W 72/04 370/329 |
| 2014/0226619 A1 | 8/2014 | Kuwahara et al. |
| 2014/0233437 A1 | 8/2014 | Abdoli et al. |
| 2015/0049836 A1* | 2/2015 | Li ..................... H04L 5/0048 375/295 |
| 2015/0146770 A1* | 5/2015 | Dore ................ H04L 25/0204 375/232 |

OTHER PUBLICATIONS

LeLe, J. P. Javaudin, channel estimation methods for preamble-based OFDM/OQAM modulations, Apr. 2007, European wireless, pp. 1-8.*

Behrouz Farhang-Boroujeny,Filter Bank Spectrum Sensing for Cognitive Radios, May 2008, IEEE, vol. 56, pp. 1801-1811.*

* cited by examiner

FILTER BANK-BASED CHANNEL STATE REPORT AND RESOURCE ALLOCATION METHOD AND APPARATUS FOR USE IN WIRELESS COMMUNICATION SYSTEM

CROSS-REFERENCE TO RELATED APPLICATION(S)

This application claims the benefit under 35 U.S.C. §119(a) of a Korean patent application filed on Sep. 12, 2014 in the Korean Intellectual Property Office and assigned Serial number 10-2014-0121314, the entire disclosure of which is hereby incorporated by reference.

TECHNICAL FIELD

The present disclosure relates to a wireless communication system. More particularly, the present disclosure relates to a filter bank-based channel state report and resource allocation method and apparatus in the wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, the mobile communication systems have evolved to a level in which they are capable of supporting high speed data communication services beyond the early voice-oriented services. However, the resource shortage and user requirements for higher speed services spur the evolution towards more advanced mobile communication systems.

In line with the requirements, there is a need of gigabit-class wireless communication technologies to prepare for the exponentially increasing data traffic.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for measuring channel quality and allocating resources based on the measurement result in a wireless communication system adopting a filter bank approach.

In accordance with an aspect of the present disclosure, a channel state report method of a receiver in a filter bank-based wireless communication system is provided. The channel state report method includes receiving filter bank information on at least two filter banks from a transmitter, measuring a channel state of each the at least two filter banks based on the filter bank information, and transmitting channel state information, which is generated based on the measurement result, to the transmitter.

In accordance with another aspect of the present disclosure, a channel state information reception and resource allocation method of a transmitter in a filter bank-based wireless communication system is provided. The channel state information reception and resource allocation method includes transmitting filter bank information on at least two filter banks to at least one receiver, receiving channel state information measured based on the filter bank information from the receiver, and transmitting resource allocation information generated based on the channel state information to the receiver.

In accordance with another aspect of the present disclosure, a receiver which reports a channel state in a filter bank-based wireless communication system is provided. The receiver includes a transceiver configured to transmit and receive signals to and from a transmitter, and a controller configured to control to receive filter bank information on at least two filter banks from a transmitter, measure a channel state of each of the at least two filter banks based on the filter bank information, and transmit channel state information, which is generated based on the measurement result, to the transmitter.

In accordance with another aspect of the present disclosure, a transmitter which allocates resources based on channel state information in a filter bank-based wireless communication system is provided. The transmitter includes a transceiver configured to transmit and receive signals to and from a receiver, and a controller configured to control to transmit filter bank information on at least two filter banks to at least one receiver, receive channel state information measured based on the filter bank information from the receiver, and transmit resource allocation information generated based on the channel state information to the receiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
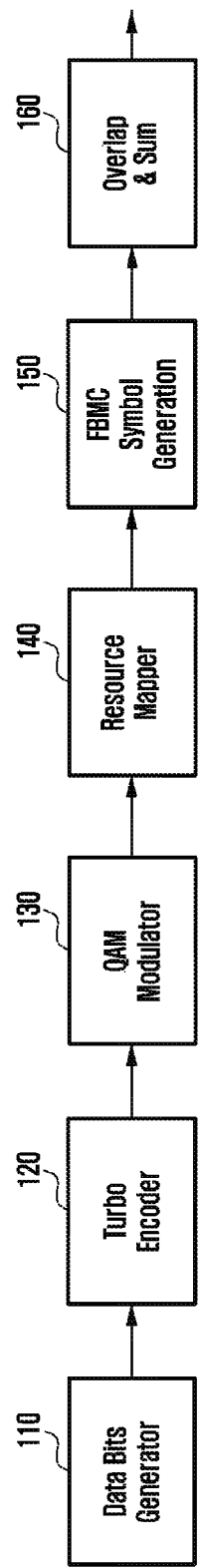
FIG. 1 is a block diagram illustrating a quadrature amplitude modulation-filter bank multi-carrier (QAM-FBMC) transmission system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted or clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those shown in drawings, in practice. The same reference numbers are used throughout the drawings to refer to the same or like parts.

Advantages and features of the present disclosure and methods of accomplishing the same may be understood more readily by reference to the following detailed description of various embodiments of the present disclosure and the accompanying drawings. The present disclosure may, however, be embodied in many different forms and should not be construed as being limited to the various embodiments of the present disclosure set forth herein. Rather, these various embodiments of the present disclosure are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the various embodiments of the present disclosure, means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing unit (CPUs) in a device or a secure multimedia card.

A description is made of a filter bank-based channel status report and resource allocation method according to an embodiment of the present disclosure hereinafter.

As described above, there is a need of gigabit class wireless communication technologies to meet the increase of data traffic. Since it is difficult to achieve the above object only by extending the frequency band, there is a need of a multiple access technique more frequency-efficient than the cyclic prefixed orthogonal frequency division multiplexing (CP-OFDM) in the next generation (beyond 4G) mobile communication system.

In this respect, filter bank multi-carrier (FBMC) which does not use CP is considered as a promising technology.

Unlink the OFDM, the legacy FBMC technology applies a filter per subcarrier to transmit signal without guard band and CP so as to improve the frequency utilization efficiency in comparison to the CP-OFDM but has to use the offset quadrature amplitude modulation (OQAM) instead of OAM which maintains orthogonality between time/frequency resources.

Since the OQAM-FBMC guarantees orthogonality in the real number domain but not in the complex number domain, it is difficult to apply the legacy channel estimation (CE) and multiple-input multiple output (MIMO) techniques in the complex radio channel environment incurring intrinsic interference.

Also, there is a method proposed to use the QAM on the FBMC but it has a drawback of low frequency utilization efficiency in comparison with the CP-OFDM and thus has not received attention.

However, a new research result on the QAM-based FBMC transmission scheme which has been published recently proposes a technique of transmitting/receiving QAM symbols with the filters designed to avoid or minimize inter-QAM symbol interference using at least two base filters unlike the legacy OQAM-FBMC. The OFDM and OQAM-FBMC can be categorized as a single pulse (=one prototype filter) multicarrier (SP-MC) system while the QAM-FBMC can be categorized as a multi-pulse multicarrier (MP-MC) system. A description is made of the QAM-FBMC system hereinafter in detail with reference to accompanying drawings.

FIG. 1 is a block diagram illustrating a QAM-FBMC transmission system according to an embodiment of the present disclosure.

Referring to FIG. 1, the data bit generator 110, the channel encoder (turbo encoder) 120, and the QAM modulator 130 configured similarly in the SP-MC system such as the legacy OFDM and OQAM-FBMC. The SP-MC system such as the OFDM and OQAM-FBMC and the MP-MC system such as QAM-FBMC are different in the part including the resource mapper 140, the FBMC symbol generator 150, and the transmission symbol generator (overlap and sum) 160.

Figure 2:
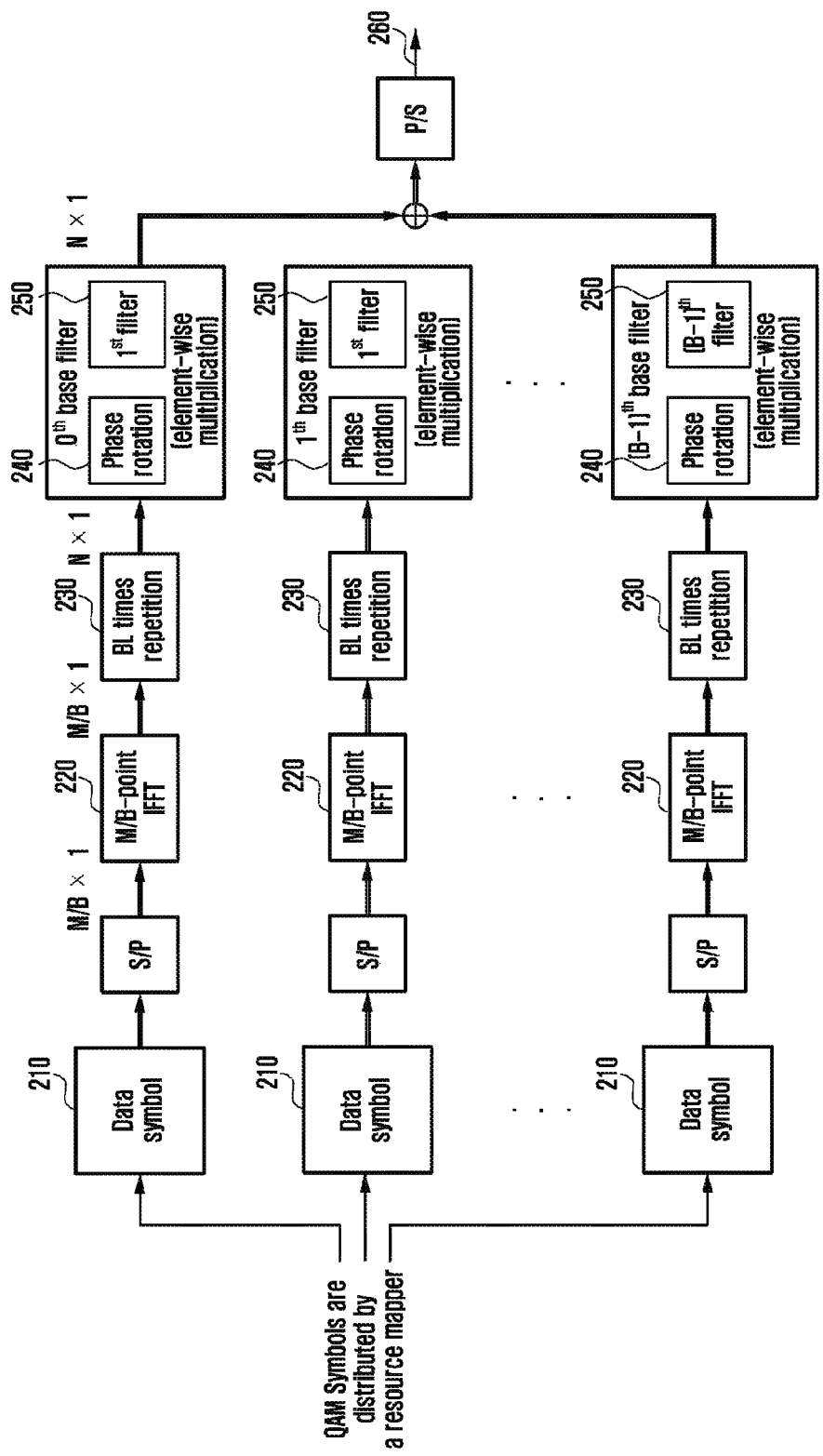
FIG. 2 is a block diagram illustrating QAM-FBMC symbol generation and flow in a QAM-FBMC system according to an embodiment of the present disclosure.

FIG. 2 is a block diagram illustrating QAM-FBMC symbol generation and flow in the QAM-FBMC system according to an embodiment of the present disclosure.

Referring to FIG. 2 shows the configuration of the FBMC symbol generator 150 of FIG. 1 which is generating a QAM-FBMC symbol with the filter bank implementation in the time domain.

Unlike the legacy OFDM system in which M QAM symbols are transformed into one OFDM symbol through inverse fast fourier transform (IFFT), the QAM-FBMC system is characterized in that the M QAM symbols are group into B groups 210 each with M/B QAM symbols and the groups pass through the respective filter banks (M/B-IFFT 220+BL repetition 230+phase rotation 240+filter coefficient multiplication 250) and then summed into a FBMC symbol finally as denoted by reference number 260.

Here, the phase rotation block 240 may be omitted depending on the design of the base filter and, since the filter back may also be implemented in the frequency domain, the QAM-FBMC symbol may be generated in another method different from that described with reference to FIG. 2.

Figure 3:
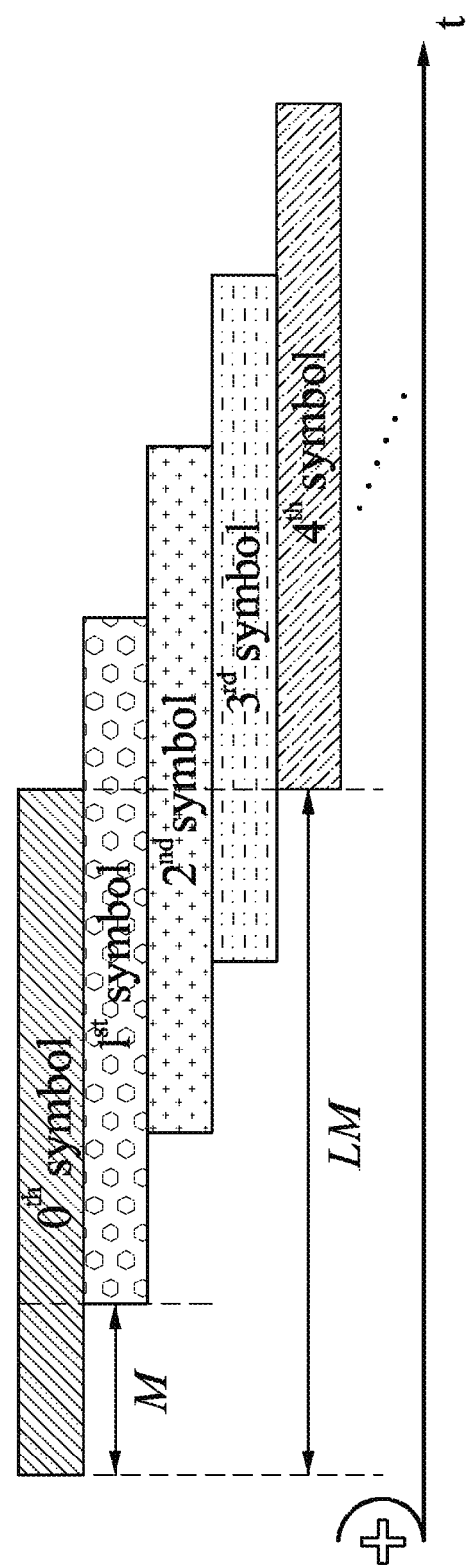
FIG. 3 is a diagram illustrating a process of shifting FBMC symbols generated through the process of FIG. 2 so as to be overlapped with each other according to an embodiment of the present disclosure.

FIG. 3 is a diagram illustrating a process of shifting the FBMC symbols generated through the process of FIG. 2 so as to be overlapped with each other an embodiment of the present disclosure.

Referring to FIG. 3, L denotes a natural number equal to or greater than 2, which is called overlapping factor and varies depending on the design of the filter. FIG. 3 is directed to a case where the overlapping factor is set to 4 (L=4).

In the QAM-FBMC system, the signals overlapped and then summed through the process as shown in FIG. 3 are output to the analog front end.

The QAM-FBMC transmission method is distinguished from the legacy OQAM-FBMC transmission method in that the pulse amplitude modulation (PAM) signal is mapped to the in-phase and quadrature signals in unit time/frequency resources and then shaped per subcarrier with one kind of prototype filter. Also, the overlapping period of the OQAM-FBMC may be shortened from M to M/2 such that more symbols are overlapped partially.

In more detail, the QAM-FBMC transmission method and the legacy OQAM-FBMC transmission method are different from each other in that the QAM-FBMC transmission method maps a plurality QAM symbols to a subcarrier to generate a QAM-FBMC symbol which is overlapped with L−1 preceding symbols and L−1 following symbols while the OQAM-FBMC transmission method maps a plurality of PAM symbols to a subcarrier to generate a OQAM-FBMC symbol which is overlapped with 2L−1 preceding symbols and 2L−1 following symbols.

Figure 4:
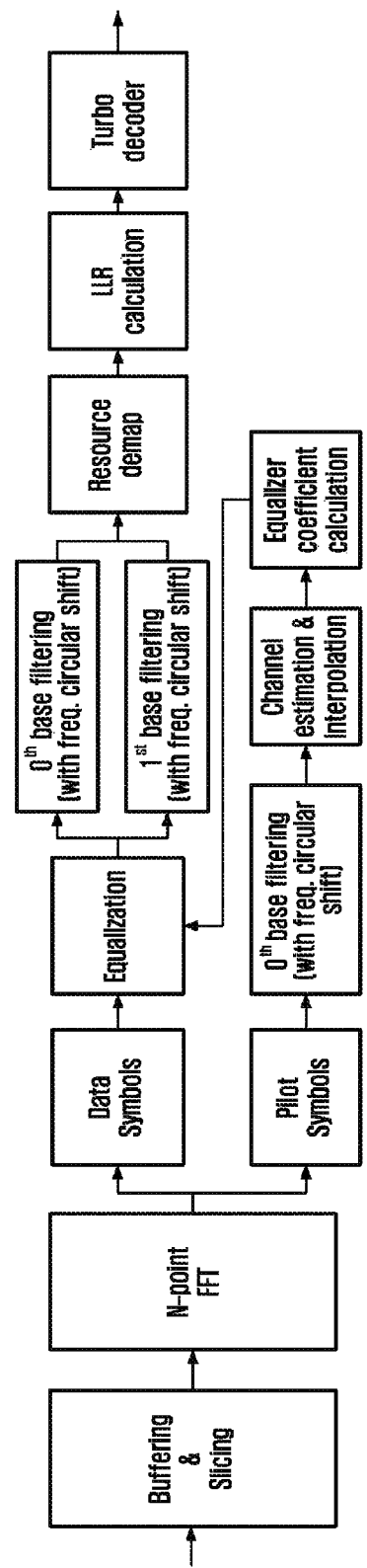
FIG. 4 is a block diagram illustrating a configuration of a QAM-FBMC receiver according to an embodiment of the present disclosure.

FIG. 4 is a block diagram illustrating a configuration of a QAM-FBMC receiver according to an embodiment of the present disclosure.

It should be noted that FIG. 4 is depicted under the assumption that B is set to 2 and the pilot is mapped to only the $0^{th}$ filter bank resources.

Typically, the QAM-FBMC receiver is implemented to operate in the reverse process of the transmitter depicted in FIG. 2. The QAM-FBMC demodulation may be implemented differently depending on the CE and channel equalization (EQ) algorithm implementation for performance improvement as exemplified in FIG. 4.

FIG. 4 shows a case of performing the received signal filtering is performed in the frequency domain unlike the time domain filtering of the transmitter of FIG. 2.

As known through the above-described process, the QAM-FBMC system has to allocate resources per filter bank as shown in FIG. 2, and the effective channel from the resource mapper of the transmitter to the resource demapper of the receiver which is necessary for demodulating the QAM symbols may vary in characteristic depending on the type of the applied filter bank, and this makes a big difference from the legacy OFDM and OQAM-FBMC systems.

Also, since the normal radio communication system uses an error correction code such as turbo code and low-density parity-check (LDPC) code, the reception performance may vary depending on how the frequency-time resources are allocated after one codeword is modulated into a QAM symbol.

Accordingly, for frequency-effective QAM-FBMC transmission, there is a need of a new resource allocation and channel quality measurement and management process which is different from that of the SP-MC system such as the legacy OFDM and OQAM-FBMC.

In the QAM-FBMC system using B (two or more) base filters, the quality of the effective channel may vary depending on the type of he filter bank, and M/B QAM symbols may be transmitted/received through each filter bank.

Due to this structural characteristics, the reception performance may vary depending on whether the resources are distributed to B filter banks after performing QAM modulation on one codeword generated through the FEC encoder in view of resource allocation, and the influence of the transmission/reception filter bank should be considered in measuring channel quality for determining channel quality indicator (CQI) to be fed back to the transmitter for link adaptation.

Particularly, since the performance indicator such as BER is significantly influenced by the worst channel among the plural channels, if the one codeword resource is distributed to multiple filter banks, the entire system throughput is influenced by the filter bank with the worst channel quality, resulting in data rate loss.

Also, since the signals are transmitted/received through a plurality of reception filters to decode a single codeword, this increases the complexity and processing delay.

In order to address the above problems, the present disclosure proposes a CQI report and resource allocation method suitable for QAM-FBMC using two or more filter banks.

In order to explain the CQI report and resource allocation method as a subject matter of the present disclosure, it is necessary to define the mapping relationships among the time/frequency resources (resource element, (RE)) for QAM-FBMC and the IFFT index of each filter bank of FIG. 2 and the physical subcarrier.

In the QAM-FBMC, at least two (=B) filter bank base filters pairs or sets should be designed to fulfil the Generalize Nyquist Condition and, at this time, the phase rotation value in each filter bank may vary depending on the designed base filter set and thus it is impossible to maintain 1:1 relationships between M IFFT indices and M physical subcarriers as in the OFDM.

That is, if the M/B IFFT indices of each filter bank have the 1:1 relationship with M/B physical subcarriers and if the space between the neighboring physical subcarriers is identical in all of the filter banks (if the space between subcarriers 1 in OFDM, this means that the interval between the subcarriers is B and identical in all filter banks of QAM-FBMC), the physical subcarriers between B filter banks may be identical with or different from each other depending on the phase rotation value (or frequency shift value) determined in designing the base filter and thus M (=B×M/B) physical subcarriers do not have 1:1 relationship in general.

For example, if there are 2 filter banks, the physical subcarriers associated with the 2 filter banks may be different from each other or identical with each other partially. That is, the physical subcarrier may be associated with only the $0^{th}$ filter bank or the $1^{st}$ filter bank or both the $0^{st}$ and $1^{st}$ filter banks.

If the physical subcarriers are sorted into three types, this means that the filter bank-based wireless communication system may use three types of RBs: RB associated with the $0^{th}$ filter bank (the first RB type), RB associated with the $1^{st}$ filter bank (the second RB type), and RB associated with both the $0^{th}$ and $1^{st}$ filter banks (the $3^{rd}$ RB type). Under such premises, assuming that the same number of REs forms one RB, the number of REs constituting the first or second RB type may be half the number of REs constituting the third RB type.

The filter bank to which the physical subcarrier or RB belongs may be predetermined in the system design phase or changed periodically or aperiodically in consideration the overhead of radio resources.

In order to cover all of the above cases, the present disclosure defines frequency-time grid (lattice) per filter bank and a rule of mapping the M/B logical subcarriers in each filter bank to M/B physical subcarriers 1 by 1 unlike OFDM.

How to define the resource grid per filter bank is described conceptually hereinafter with reference to FIGS. 5A and 5B.

Figure 5B:
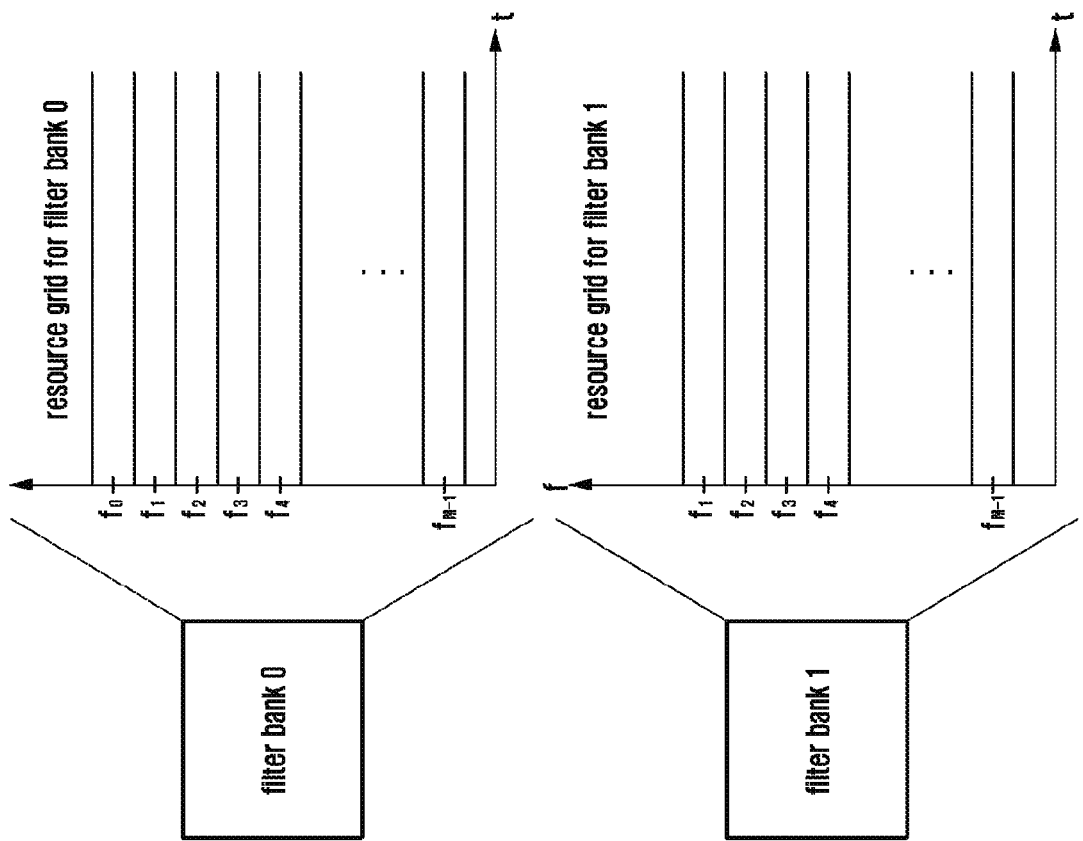
FIGS. 5A and 5B are diagrams illustrating a method of defining a resource grid per filter bank according to an embodiment of the present disclosure.
Figure 5A:
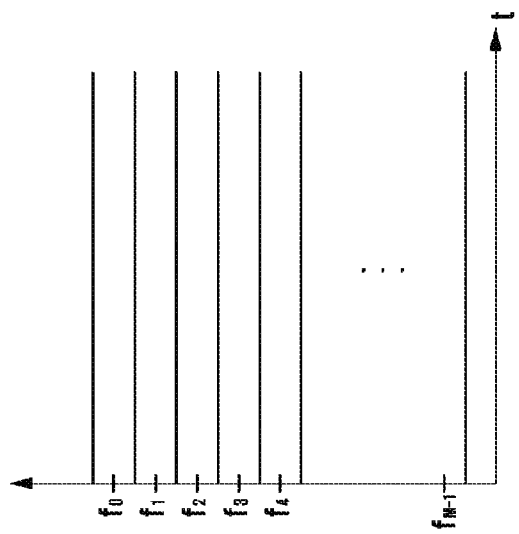

FIGS. 5A and 5B are diagrams illustrating a method of defining a resource grid per filter bank according to an embodiment of the present disclosure.

FIG. 5A shows time-frequency resources for use in the QAM-FBMC system according to an embodiment of the present disclosure. Referring to FIG. 5A, M orthogonal subcarriers $f_0$ to $f_{M-1}$ are arranged on the frequency axis. In the legacy OFDM system, the subcarriers on the frequency axis and the symbols on the time axis constitute REs.

In the QAM-FBMC, however, it is required to define the resource grid per filter bank as described above and this means to define the mapping relationship between the physical frequency resources as shown in FIG. 5A and the logical frequency resources per filter bank.

FIG. 5B shows the resource grid for filter bank 0 to which the subcarriers with the even-numbered indices are mapped and the resource grid for filter bank 1 to which the subcarriers with the odd-numbered indices are mapped. The mapping relationship shown in FIG. 5B is just an example but the present disclosure is not limited thereto.

The per-filter bank frequency-time resource grid (lattice) can be defined in various manners, and an embodiment of the present disclosure proposes a per-filter bank frequency-time resource grid defined as follows.

(Definition 1) $RE_b[m][n]$:=resource element corresponding to the $b^{th}$ filter bank, the $m^{th}$ subcarrier, and the $n^{th}$ QAM-FBMC symbol (b=0, 1, ..., B-1, m=0, 1, ..., $M_b$-1, n=0, 1, ..., $N_{sym}$-1).

B: number of base filters (≥2).

$M_b$: maximum number of QAM symbols which can be mapped in the $b^{th}$ filter bank (≤M/B).

M: Total number of subcarriers of QAM-FBMC symbol with inclusion of null subcarriers (this is identical with OFDM-based FFT/IFFT size).

$N_{sym}$: Number of FBMC symbols constituting one resource block (RB).

$M_b^{null}$: Number of nulling subcarriers in the $b^{th}$ filter bank (DC, including guard subcarrier) ($M_b+M_b^{null}$=M/B).

The reason for specifying (Definition 1) as above is that some subcarriers may be nulled in each filter bank in the QAM-FBMC system for the same purposes as the OFDM system in which the number of REs is configured to be less than M because some of M subcarriers are nulled to satisfy the spectrum mask given in the OFDM system. Particularly, since the base filters may have different frequency response characteristics, the number of nulling subcarriers may vary depending on the filter bank.

(Definition 2) $f_{b,m}$:=Baseband (i.e., digital) physical subcarrier frequency corresponding to the $m^{th}$ logical subcarrier of the $b^{th}$ filter bank, $f_{b,m}$:=$(BI_b(m)/M+\Delta f_b)$.

$I_b(m) \in \{0, 1, ..., M/B-1\}$: Function mapping the $m^{th}$ logical subcarrier of the bth filter bank to IFFT index (i.e., mapping $M_b$b data subcarriers and $M_b^{null}$ subcarriers to M/B-IFFT).

$\Delta f_b$: Frequency domain frequency shift value corresponding to time domain phase rotation (the characteristic of the filter bank is determined depending on the above parameter and varies depending on the filter bank).

Per-subcarrier QAM symbols are modulated in the format of $e^{j2\pi f_{b,m}t}$.

Descriptions are made of the method of measuring and reporting CQI and the method of allocating resources for data transmission according to an embodiment of the present disclosure using the above definitions.

Typically, a transmitter transmits a pilot or reference signal (RS) at RE positions agreed between the transmitter and receiver in order for the receiver to measure the channel quality between the transmitter and receiver, and the transmitter measures the RS signal at the corresponding positions to compute the channel quality. For example, the channel quality between the transmitter and receiver may be computed using the cell-specific CRS and CSI-RS in long term evolution (LTE).

The RS is positioned in the frequency-time resource (RE) grid in such a way of being distributed in the given system frequency band to make it possible to measure the channel quality with small overhead (scattered pilot pattern).

Unlike the OFDM system in which the RSs are arranged within a large RE grid, the QAM-FBMC system is characterized in that the RSs are arranged in the RE grid per filter bank (B) according to the mapping relationship of above-described definitions 1 and 2. Since the characteristic of the filter bank varies depending on the system design, the corresponding RSs may be arranged uniformly at the REs of all filter banks or some specific filter banks.

Such alternatives may be determined depending on the design strategy of the base filter set of the filter bank. Accordingly, the transmitter has to inform the receiver of the information on its filter banks (hereinafter, referred to as filter bank information) such as base filter set information (B value, filter coefficient, etc.) and RB configuration scheme and RE-physical subcarrier mapping scheme information ($I_b(m)$, $\Delta f_b$, etc.) or share the above information with the receiver in advance, in order for the receiver to perform channel quality measurement at the correct RS transmission positions.

Meanwhile, the receiver determines its current channel condition based on the received RS and, in this case, the channel may be the effective channel of integrating the effects of the pure air (radio) front end channel and the filter effect transmitter/receiver.

If the RSs are distributed uniformly within the respective filter banks, the effective channel of each filter bank may be measured based on the RS signal received within its filter bank. If the RSs are distributed non-uniformly within a specific filter bank, it is necessary to measure the effective channel of the filter bank corresponding to the RSs and then the pure air front end channel, and after the CE, it is possible to measure the effective channel of the corresponding filter bank by applying the transmission/reception filter corresponding to the target filter bank.

Typically, the channel state information (CSI) measured through the above procedure is converted to a signal-to-interference-plus-noise ratio (SINR). Afterward, the receiver generates a modulation and coding scheme (MCS) level corresponding to the SINR and transmits the MCS level information bits called CQI.

In an embodiment of the present disclosure, the receiver may transmit the per-filter bank CQI periodically or aperiodically. The transmitter forms the resource grid (or RB) per filter bank based on the CQI, generates the codeword with different MCS level per filter bank, allocates resources for the codeword, and transmits the data using the allocated resources.

The present disclosure proposes a transmitter's request-based aperiodic channel quality measurement and procedure and RB-based filter bank resource configuration method and management procedure.

The aforementioned methods and procedures may include a filter information configuration and sharing method, a per-filter bank RE grid-real physical subcarrier mapping and RS arrangement method, a method of configuring multiple REs into one RB, and a periodic/aperiodic CQI feedback method.

In wireless communication, typically the receiver may receive the system information of the transmitter after acquiring synchronization with the transmitter. For this purpose, the transmitter broadcasts its system information periodically or transmits the system information in the unicast manner to the receiver in order for the receiver to receive the control information and data information correctly.

Figure 6:
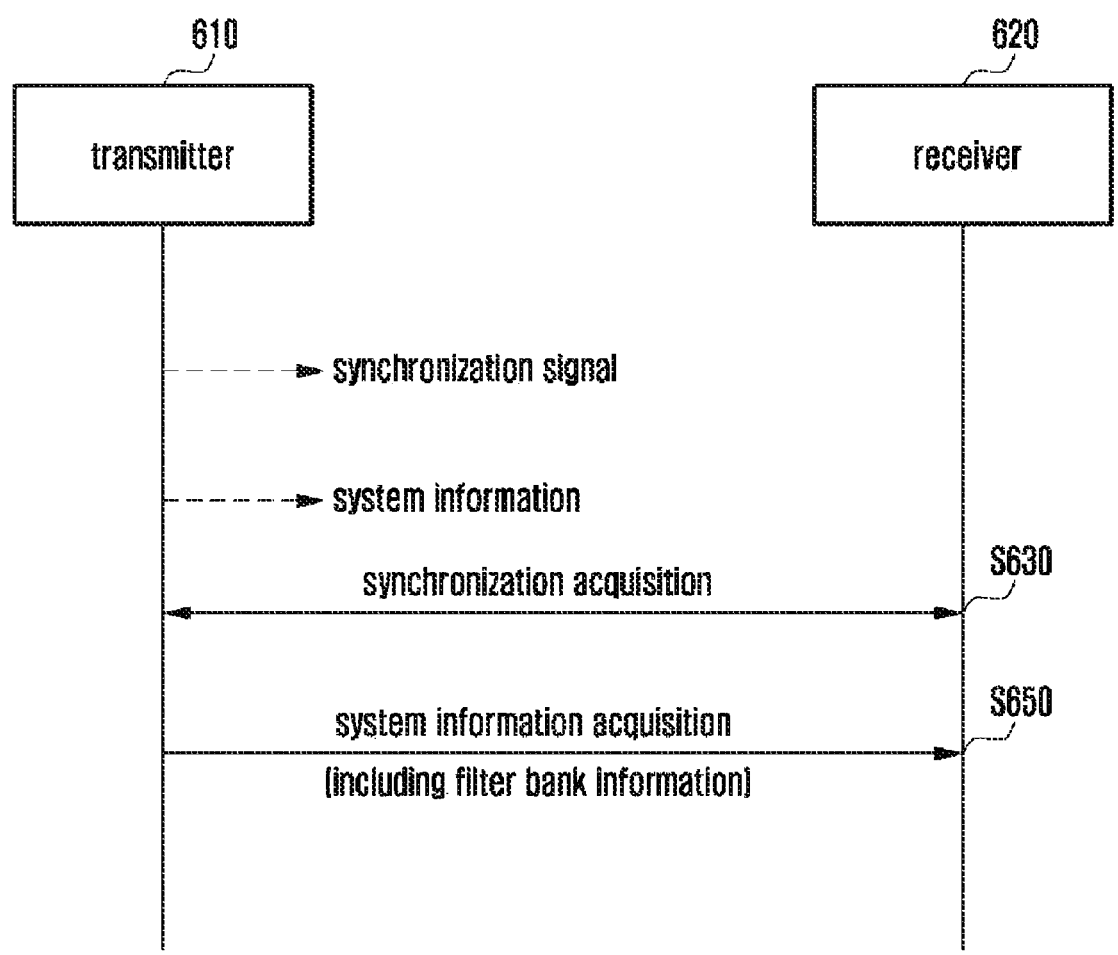
FIG. 6 is a signal flow diagram illustrating signal flow between a transmitter and receiver in order for the receiver to establish synchronization with the transmitter and acquire system information from the transmitter according to an embodiment of the present disclosure.

The description of the above procedure is made with reference to FIG. 6.

FIG. 6 is a signal flow diagram illustrating signal flow between the transmitter and receiver in order for the receiver to establish synchronization with the transmitter and acquire system information from the transmitter an embodiment of the present disclosure.

Referring to FIG. 6, the transmitter 610 transmits a periodic or aperiodic synchronization signal and system information. The receiver 620 detects the transmitter 610 and, if synchronization is established at operation S630, acquires a master information block (MIB). The MIB may include scheduling information on the system information blocks (SIBs).

Afterward, the receiver 620 receives the system information transmitted by the transmitter 610 at operation S650. The system information may include the cell ID, bandwidth, and frequency information of the transmitter 610 and preferably, in the case of the QAM-FBMC system considered in the various embodiments of the present disclosure, the system information may further include the filter bank information as follows:

Number of filter banks for use (=B).
Number of frequency resources available in each filter bank (=$M_b$) or number of nulling resources (=$M_b^{null}$) (if $M_b+M_b^{null}$=MIB is fulfilled and if DC exists, it is included in $M_b^{null}$).
mapping relationship between logical subcarrier resources within filter bank and real physical subcarriers
e.g., $RE_b[m][n] \leftrightarrow f_{b,m}:=I_b(m)$ and $\Delta f_b$ in $(BI_b(m))/M+\Delta f_b$.
pilot signal position per filter bank for CQI measurement and CE (number of pilot signal in each filter bank may be uniform or not, i.e., more pilot signals in specific filter banks).
Type of resource allocation (part of following schemes is applicable).
1. Configuring subcarriers, consecutive in a filter bank, into one RB.
2. Configuring subcarriers, distributed in a filter bank, into one RB.
3. Configuring a group of subcarriers, consecutive across at least 2 filter banks, into one RB.
4. Configuring a group of subcarriers, distributed across at least 2 filter banks, into one RB.

Although the description is directed to the case where the filter bank information is included in an SIB, the preset disclosure is not limited thereto. The filter bank information may be included in the MIB which the receiver 620 receives after acquiring synchronization or shared in advance between the transmitter 610 and the receiver 620.

The filter bank information also may be carried through dedicated signaling such as upper layer signaling from the transmitter to the receiver.

Figure 7:
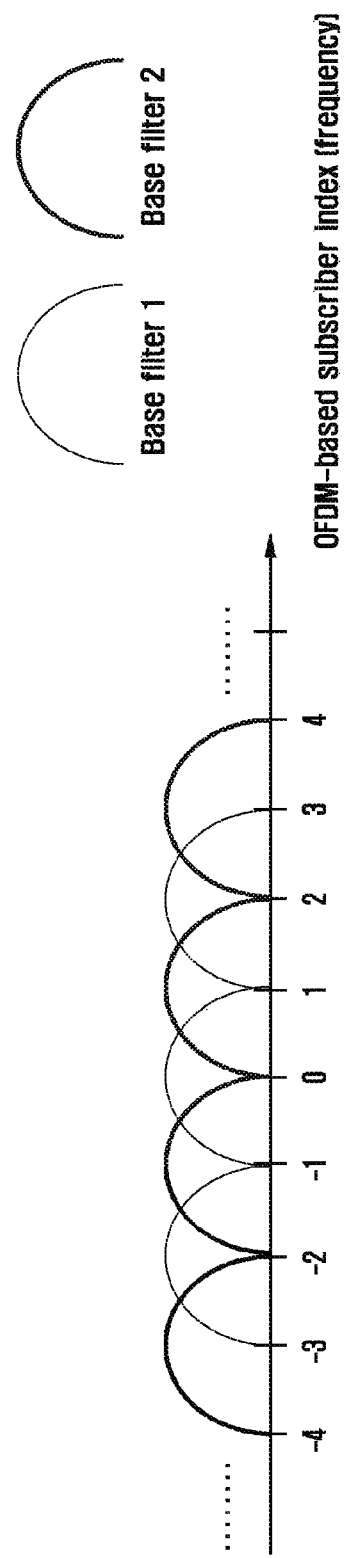
FIGS. 7 and 8 are diagrams for explaining a change in probability of a relationship between an intra-filter bank subcarrier resources and real physical subcarriers depending on a filter design strategy despite a number of filter banks (B=2) not being changed according to an embodiment of the present disclosure.
Figure 8:
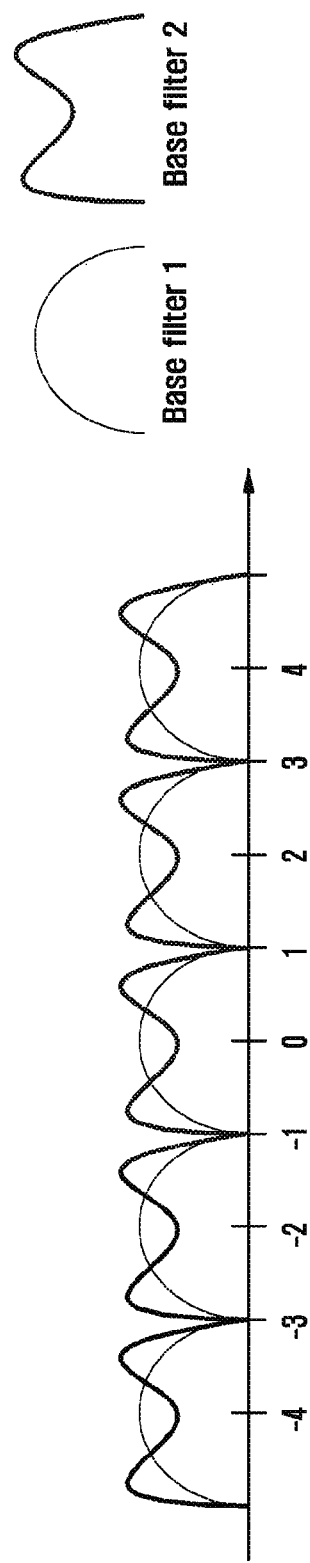

FIGS. 7 and 8 are diagrams for explaining the change probability of relationship between the intra-filter bank subcarrier resources and real physical subcarriers depending on the filter design strategy despite a number of filter banks (B=2) not being changed according to an embodiment of the present disclosure.

FIG. 7 is a diagram illustrating shapes of two base filters arranged for OFDM-based subcarriers, assuming B=2 and $\Delta f_b$=b/M.

FIG. 8 is a diagram illustrating shapes of two base filters arranged for OFDM-based subcarriers, assuming B=2, and $\Delta f_b$=0.

The receiver 620 acquires system information at operation S650 of FIG. 6 and then measures channel quality periodically for link adaptation between the transmitter 610 and the receiver 620 to feed back CQI to the transmitter 610.

A description is made of a channel quality measurement and CQI selection method according to an embodiment of the present disclosure hereinafter.

The receiver may performs channel quality measurement on the signal received at $RE_b[m][n]$ position to which the pilot signal is mapped in the frequency-time grid (the $RE_b[m][n]$ position may be agreed in advance or informed through system information).

In this case, the received signal is the effective signal passed a filter of the transmitter, a physical air channel, and a filter of the receiver. The receiver may determine CQI per filter bank based on the effective channel.

The CQI may be determined with various metrics such as representative SINR estimation method based on the inverse average sum-capacity function. It may also be possible to determine a representative CQI of the whole band covered by the filter bank (per-filter-bank wide-band CQI (pFB-WB-CQI) or a representative CQIs of the respective sub-bands (per-filter-bank sub-band CQI, FB-SB-CQI).

If the pilot signal (e.g., CSI-RS) for channel quality measurement is arranged for only a specific filter, the receiver first measures the channel quality of the filter bank for which the pilot signal is arranged and then the channel qualities of other filter banks for which no CSI-RS is arranged. In order to achieve this, the receiver removes the transmission/reception filtering effect of the corresponding bank from the received CSI-RS of the filter bank for which the CSI-RS is arranged and then measures the effective channel quality by adding the transmission/reception filtering effect of the filter bank for which no CSI-RS is arranged.

The above-procedure is described in detail hereinafter with reference to an Equation.

First, the signal transmitted by the transmitted can be expressed as Equation 1.

$$x_T[n] = \sum_{k=-\infty}^{\infty} \sum_{b=0}^{B-1} \sum_{s=0}^{M/B-1} D_{b,s}[k] p_{T,b,s}[n-kM] \quad \text{Equation 1}$$

The variables of Equation 1 are defined as:
$D_{b,s}[k]$: QAM signal of the $s^{th}$ physical subcarrier of the $b^{th}$ filter bank.
$p_{T,b,s}[n-kM]$: FBMC modulation pulse of the $s^{th}$ physical subcarrier of the $b^{th}$ filter bank (this is expressed as a product of the base filter and modulation frequency exp (j*2*pi*f_b*n)).
k: QAM-FBMC symbol index.

The signal received by the receiver can be expressed as Equation 2.

$$x_R[n] = \sum_{k=-\infty}^{\infty} \sum_{b=0}^{B-1} \sum_{s=0}^{M/B-1} D_{b,s}[k](p_{T,b,s}[n-kM] * h[n]) + w[n] \quad \text{Equation 2}$$

The variables of Equation 2 are defined as:
h[n]: multipath channel (number of taps=Lc).
w[n]: AWGN.
The QAM-FBMC demodulation signal corresponding to symbol 0 at the receiver can be expressed as Equation 3.

Equation 3

$$\hat{D}_{b',s'}[0] = P_{T,b',s'}^H X_R[0]$$

$$= P_{T,b',s'}^H W_N [I_N \ 0] H W_N^H P_{T,b',s'} D_{b',s'}[0] +$$

$$\sum_{k=1}^{L} \sum_{b=0}^{B-1} \sum_{s=0}^{M/B-1} P_{T,b',s'}^H W_N \begin{bmatrix} 0 & I_{N+hl-kM} \\ 0 & 0 \end{bmatrix} H W_N^H P_{T,b,s} D_{b,s}[-k] +$$

$$\sum_{b \neq b'}^{B-1} \sum_{s \neq s'}^{M/B-1} P_{T,b',s'}^H W_N [I_N \ 0] H W_N^H P_{T,b,s} D_{b,s}[0] +$$

$$\sum_{k=1}^{L-1} \sum_{b=0}^{B-1} \sum_{s=0}^{M/B-1} P_{T,b',s'}^H W_N \begin{bmatrix} 0 & 0 \\ I_{N-kM} & 0 \end{bmatrix} H W_N^H P_{T,b,s} D_{b,s}[k] +$$

$$P_{T,b',s'}^H \underline{W}[0]$$

The variables of Equation 3 are defined as:
$W_N$: DFT matrix (N×N).
H: Toeplitz channel matrix (M+N)×N.
$P_{T,b',s'}$: Frequency domain transmission filter coefficient N×1 of the $s'^{th}$ physical subcarrier resource element of the $b'^{th}$ filter bank.

Line 2 denotes the term of a receiver-desired signal, 3-5 lines denote the term of interference input to the receiver from other symbol/frequency resources, and line 6 denotes the noise term at the corresponding resource element.

This means that a pilot or QAM data symbol may be arranged.

Assuming Lc=3, M=3, and L=2; the Toeplitz channel matrix H can be exemplified as Equation 4 (empty positions are all zero elements).

$$H = \begin{bmatrix} h[0] & & & & & & & \\ h[1] & h[0] & & & & & & \\ h[2] & h[1] & h[0] & & & & & \\ & h[2] & h[1] & h[0] & & & & \\ & & h[2] & h[1] & h[0] & & & \\ & & & h[2] & h[1] & h[0] & & \\ & & & & h[2] & h[1] & h[0] & \\ & & & & & h[2] & h[1] & \\ & & & & & & h[2] & \\ & & & & & & & 0 \end{bmatrix}$$

Equation 4

The channel of the (b', s') resource element as estimated channel including the filter bank can be expressed as Equation 5.

$$\underline{P}_{T,b',s'}^H W_N[I_N 0] H W_N^H \underline{P}_{T,b',s'}$$

Equation 5

That is, Equation 5 means estimation of the channel including the filter bank (see line 2 of Equation 3).

Meanwhile, the process of estimating the original channel from which the transmission/reception filtering is removed or weaken can be expressed as Equation 6.

$$W_N[I_N 0] H W_N^H$$

Equation 6

Equation 6 may denote estimation of all N×N values or diagonal term.

If a base filter with good orthogonality and spectrum confinement is used, the channel having the pilot signal is expressed as $\underline{P}_{T,b',s'} W_N[I_N \ 0] H W_N^H \underline{P}_{T,b',s'} \approx [\text{diag}(W_N[I_N \ 0] H W_N^H)]_{s'}$ (diagonal component value of the channel matrix corresponding to the $s^{th}$ physical subcarrier) and thus it is possible to recover the channel $W_N[I_N \ 0] H W_N^H$ of the whole band through interpolation and then estimate the effective channel to which other filter banks are applied like $\underline{P}_{T,b',s'}^H W_N[I_N \ 0] H W_N^H \underline{P}_{T,b',s'}$ by multiplying the (frequency domain) reception filters of other filter banks to the left and the transmission filters to the right.

Afterward, the channel representative value is calculated by driving the sum capacity of the effective channels of the respective filter banks using this Equation (since various metrics can be used, detailed description thereof is omitted).

Orthogonality (Generalized Nyquist Condition) is set forth in Equation (7).

$$\sum_{n=-\infty}^{\infty} p_{T,b,s}[n-kM] p_{T,b',s'}^*[n-k'M] = \delta_{k,k'} \delta_{b,b'} \delta_{s,s'}$$

Equation 7

The reception filter is a matched filter of the transmission filter, the left term denotes the inner product between the filter of the sth frequency resource of the bth filter band of the transmitter and the filter of the s'th frequency resource of the b'th filter bank of the receiver, and it may be defined that the orthogonality is guaranteed when the product becomes 1 in the case that all of the symbol indices (k, k'), filters indices (b, b'), and frequency indices (s, s') match each other respectively and when the product becomes 0 in the case the indices mismatch, and this is referred to as GNC. In real word, the base filter set applied to the QAM-FBMC does not satisfy the above conditions perfectly but subject to the SIR equal to or greater than 20 (i.e., this means it is semi- or quasi-orthogonal).

In the transmission/reception filter of the filter bank for which the CSI-RS is arranged, it is possible to use a combination of filters with orthogonality which makes the transmission/reception filtering effect disappear almost (this depends on the orthogonality, i.e., how well the generalized Nyquist condition is satisfied) when there is no synchronization error, resulting in improvement of physical channel coefficient estimation accuracy. Also, in the frequency selective (multipath) fading environment, it is possible to improve the physical air channel coefficient estimation accuracy by using the base filter having the spectrum confinement (well-localized in frequency domain) characteristic which confining most energy in a narrow frequency spectrum of the filter as well as the orthogonality.

Based on the above described factors, a description is made of the channel quality measurement procedure of the receiver according to an embodiment of the present disclosure hereinafter with reference to accompanying drawing.

Figure 9:
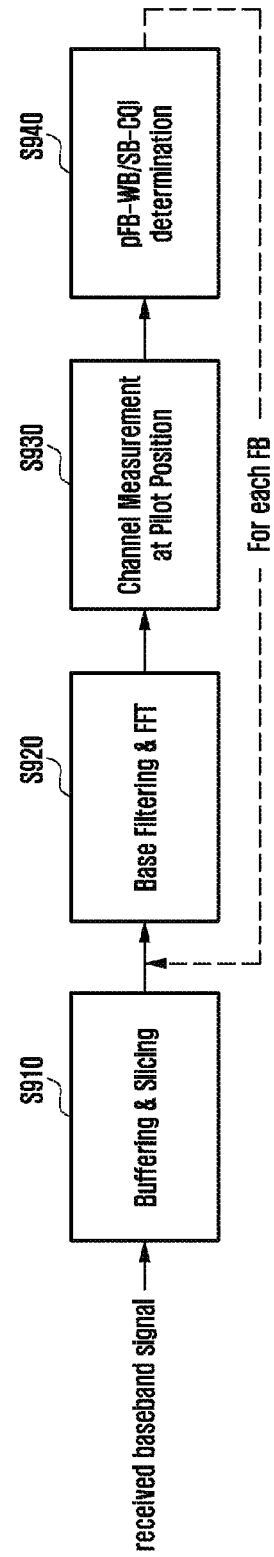
FIG. 9 is a diagram illustrating a process of measuring effective channel quality of a specific filter bank when a pilot signal is arranged uniformly across filter banks according to an embodiment of the present disclosure.

FIG. 9 is a diagram illustrating a process of measuring effective channel quality of a specific filter bank when the pilot signal is arranged uniformly across the filter banks according to an embodiment of the present disclosure.

Referring to FIG. 9, the received baseband signal is buffered (this is required because the symbol length is N but the shift period is M, N=LM) and sliced (process of taking length N sample at period of M in the buffer), at operation S910, as the reverse process of the overlap & and sum process of the transmitter. The sliced signal passes the reception filter and FFT at operation S920.

As aforementioned, the reception filtering and FFT may be performed in inverse order depending on the implementation of the receiver.

After the filtering and FFT processes, the receiver measures channel state based on the reception RE_b [m][m] corresponding to the CSI-RS transmission position according to the known mapping rule at operation S930. Next, the receiver determines pFB-WB-CQI or pFB-SB-CQI according to the given metric and option at operation S940.

Next, the receiver feeds back the determined CQI to the transmitter. The receiver may repeat operations S920 to S940 per filter bank.

Although the description is directed to the process of measuring and feeding back CQI, the present disclosure is not limited thereto. In a case of LTE, it is possible to generate a rank indicator (RI) and a precoding matrix indicator (PMI) and transmit them to the transmitter through the process as described above.

A description is made of the channel measurement feedback process hereinafter.

Figure 10:
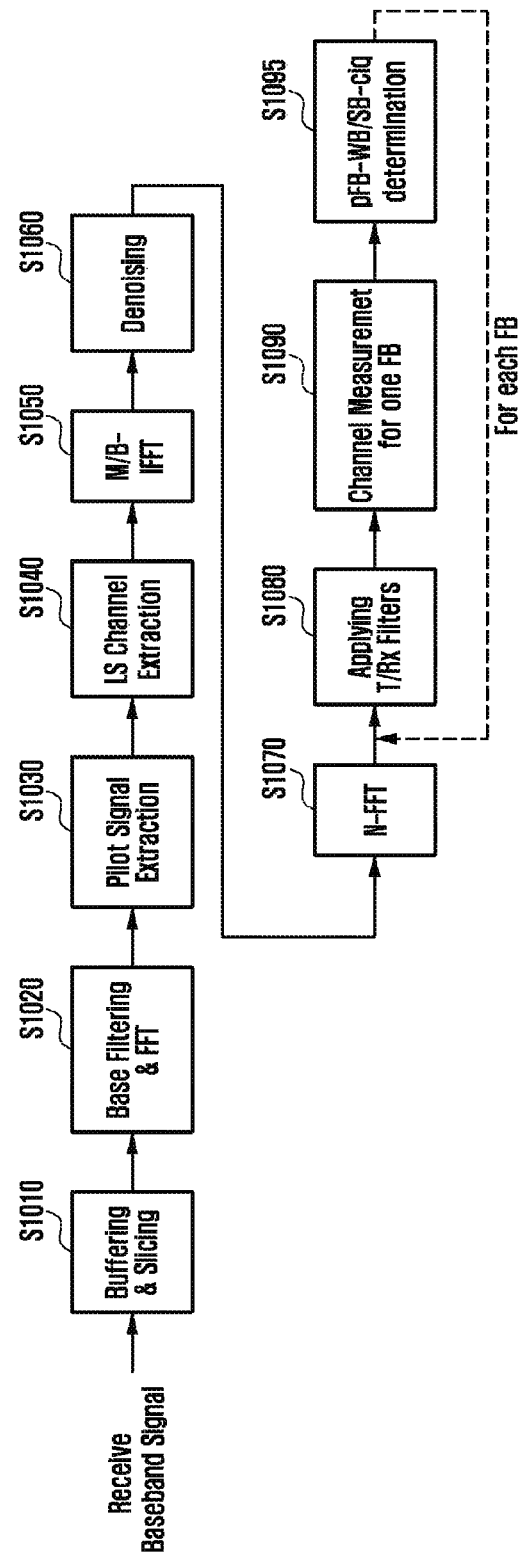
FIG. 10 is a diagram illustrating a process of measuring effective channel quality per filter bank when a pilot signal is arranged within a specific filter bank according to an embodiment of the present disclosure.

FIG. 10 is a diagram illustrating a process of measuring effective channel quality per filter bank when the pilot signal is arranged within a specific filter bank according to an embodiment of the present disclosure.

Referring to FIG. 10, the received baseband signal is buffered and sliced at operation S1010. Next, the receiver performs reception signal filtering and FFT on the filter bank in which the CSI-RS is arranged at operation S1020. Then the receiver extracts the pilot signal (CSI-RS) at operation S1030.

The receiver estimates the frequency domain channel based on the extracted pilot signal at operation S1040. Although FIG. 10 is directed to a case of adopting Least Square, the present disclosure is not limited thereto but may adopt other frequency domain CE techniques available for OFDM.

Afterward, the receiver performs IFFT at operation S1050 and denoising on the time domain channel at operation S1060 to mitigate noise and interference, thereby improving time domain channel impulse response (CIR) estimation accuracy.

Next, the receiver acquires the frequency domain channel with high resolution through N-FFT (big size, N=LM) at operation S1070. Next, the receiver reapplies the transmission/reception filtering per filter bank at operation S1080. Then, the receiver estimates the effective channel at operation S1090 and determines pFB-WB-CQI or pFB-SB-CQI based on the estimation result according to the given metric and option at operation S1095.

Afterward, the receiver may feedback the determined CQI to the transmitter. The receiver may repeat operations S1080 to S1095 per filter bank.

The channel measurement result determined through the process of FIG. 9 or FIG. 10 (i.e., pFB-WB/SB-CQI) is transmitted to the transmitter though an uplink channel in consideration of overhead in various methods as follows.

The CQI feedback modes can be categorized into a periodic feedback mode and an aperiodic feedback mode. In the periodic feedback mode, the receiver transmits CQI at a period agreed between the transmitter and the receiver. At this time, the pFB-CQIs of the filter banks may be transmitted simultaneously or sequentially one by on at every feedback period in consideration of the overhead. According to an embodiment of the present disclosure, in the case of periodic feedback, the CQI may be transmitted through an uplink control channel. However, the CQI may be transmitted through a data channel in consideration of the uplink channel overhead even in the periodic feedback mode.

In the case of the aperiodic feedback mode, the receiver calculates the CQI according to the control information from the transmitter and feeds back the CQI at the timing determined by the transmitter. The control information may include downlink control information (DCI). The transmitter may configure the receiver to report the CQI using a specific information field of the DCI. For this purpose, a new information filed may be added to the legacy DCI or a new DCI format may be defined.

The transmitter may send the receiver various commands in consideration of the scheduling environment. For example, the transmitter may request for at least one CQI of a specific band of a specific filter bank of the receiver or the CQI for the defiltered channel quality from which the transmission/reception filter effect is removed (including digital to analog conversion (DAC), radio frequency (RF), pure air channel, RF before reception filtering, and DAC, after transmission filtering) in the form of wideband (DF-WB-CQI) or sub-band (DF-SB-CQI).

A process of measuring the radio channel state between the transmitter and receiver and transmitting the measurement result in the form of feedback information has been described above.

Hereinafter, a description is made of the process of allocating resources to the receiver based on the feedback information from the receiver with reference to FIG. 11.

Figure 11:
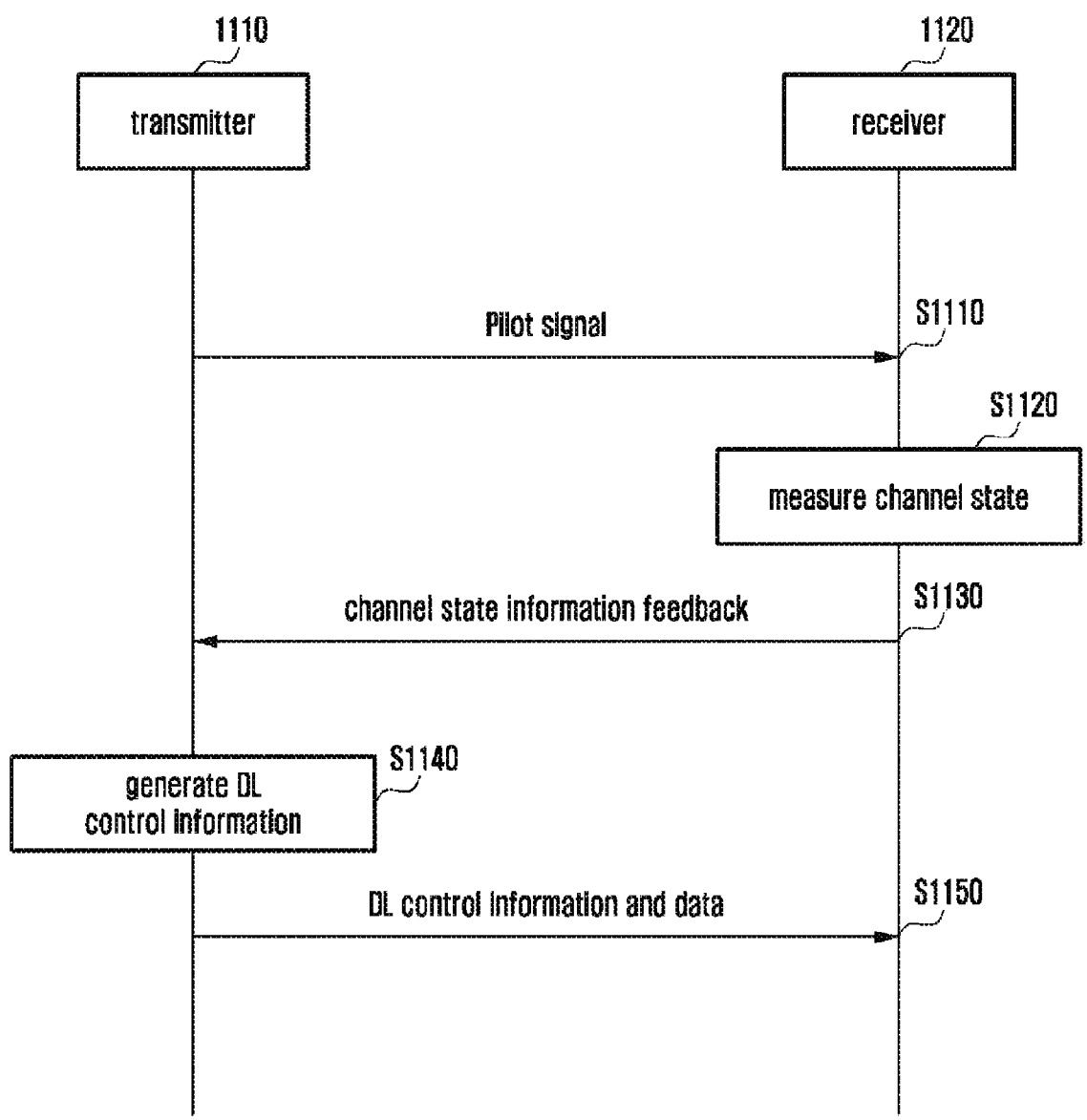
FIG. 11 is a signal flow diagram illustrating a procedure of allocating resources to a receiver based on feedback information from a receiver according to an embodiment of the present disclosure.

FIG. 11 is a signal flow diagram illustrating a procedure of allocating resources to a receiver based on the feedback information from the receiver according to an embodiment of the present disclosure.

Since operations S110, S1120, and S1130 for measuring channel state and feeding back the measurement result have been described above, detailed description thereof are omitted herein.

If the channel state information (e.g., CQI) is received from the receiver 1120, the transmitter inputs the CQI to the scheduler at operation S1140. Then the transmitter 1110 maps data information to frequency-time resources per receiver. For this purpose, the transmitter 1110 generates downlink control information at operation S1150. The downlink control information may include resource allocation scheme, used filter bank, and data mapping position. The receiver 1120 can identify the resources allocated by the transmitter 1110 and demodulate the data based on the downlink control information.

As described above, it may be possible to apply different MCS levels to the resource grids of the respective filter banks to improve the data transmission efficiency.

It may be possible to transmit the downlink control channel information to the receiver 1120 along with data through a downlink control channel (similar to LTE physical downlink control channel (PDCCH)).

The resource block (RB) (or resource grid) as the smallest unit of resource allocation proposed in an embodiment of the present disclosure may be configured according to four schemes (or resource allocation types) as follows.

1. Type of configuring subcarriers, consecutive in one filter bank, into one RB (first type).
2. Type of configuring subcarriers, distributed in one filter bank, into one RB (second type).
3. Type of configuring groups of subcarriers, consecutive in at least two filter banks, into one RB (third type).
4. Type of configuring groups of subcarriers, distributed in at least two filter banks, into one RB (fourth type).

Meanwhile, in the case of mapping data symbols in the resource grid, it should be noted that the symbol mapping may be performed in various ways, e.g., mapping symbols to time resources first and changing mapping indices, although it is typical to amp the symbols to the frequency resources among the time-frequency resources to reduce processing delay.

FIGS. 12A to 15B are diagrams illustrating various cases of configuring one RB with 24 QAM symbols in the format of 4×6 (4 subcarriers×6 symbols) in the first to fourth types of resource allocation according to an embodiment of the present disclosure.

Referring to FIGS. 12A to 15B, the horizontal axis represents consecutive QAM-FBMC symbol indices, and the vertical axis represents consecutive physical subcarrier indices in one filter bank, M=16, B=2, $M_b^{null}=0$ (i.e., $M_b=8$, ∀b), and pilot signals are omitted (meanwhile, the RS may be arranged in a distributed manner or a consecutive manner in part of the corresponding resources, and the data symbols may be mapped to the positions in the same manner with the exception of the RS positions).

Figure 12A:
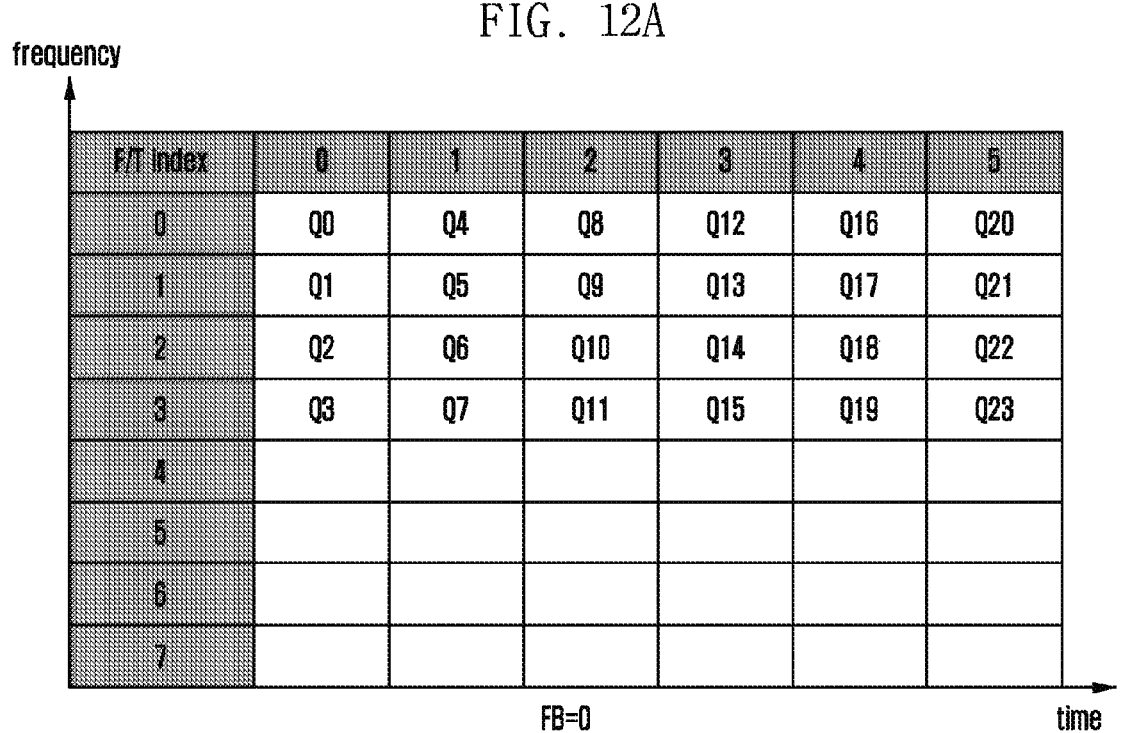
FIGS. 12A and 12B are diagrams illustrating a first type of resource block (RB) configuration with subcarriers, consecutive in one filter bank, according to an embodiment of the present disclosure.
Figure 12B:
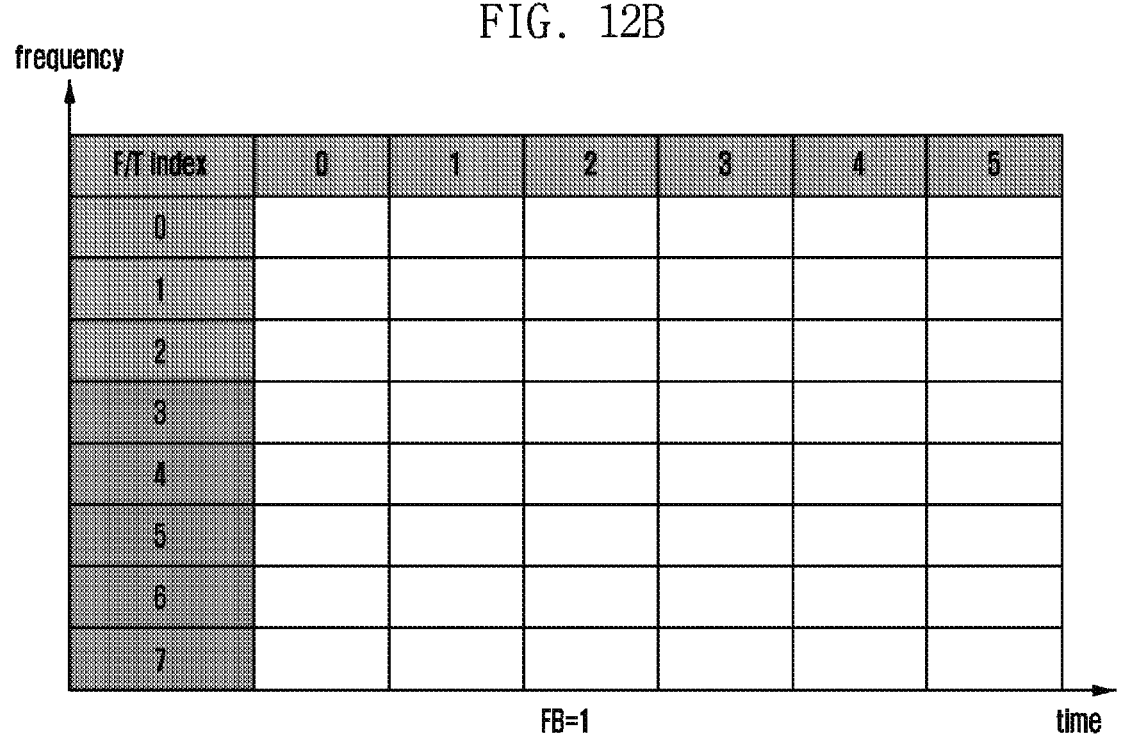

FIGS. 12A and 12B are diagrams illustrating the first type RB configuration with the subcarriers, consecutive in one filter bank, according to an embodiment of the present disclosure.

Referring to FIGS. 12A and 12B, the transmitter may schedule the receiver in such a way of mapping the data symbols to the resource grid (or RB) associated with one filter bank (FIG. 12A) but the resource grids associated with other filter banks (FIG. 12B). According to the first type, the subcarriers to which the data symbols are mapped are consecutive as shown in FIG. 12A.

Figure 13A:
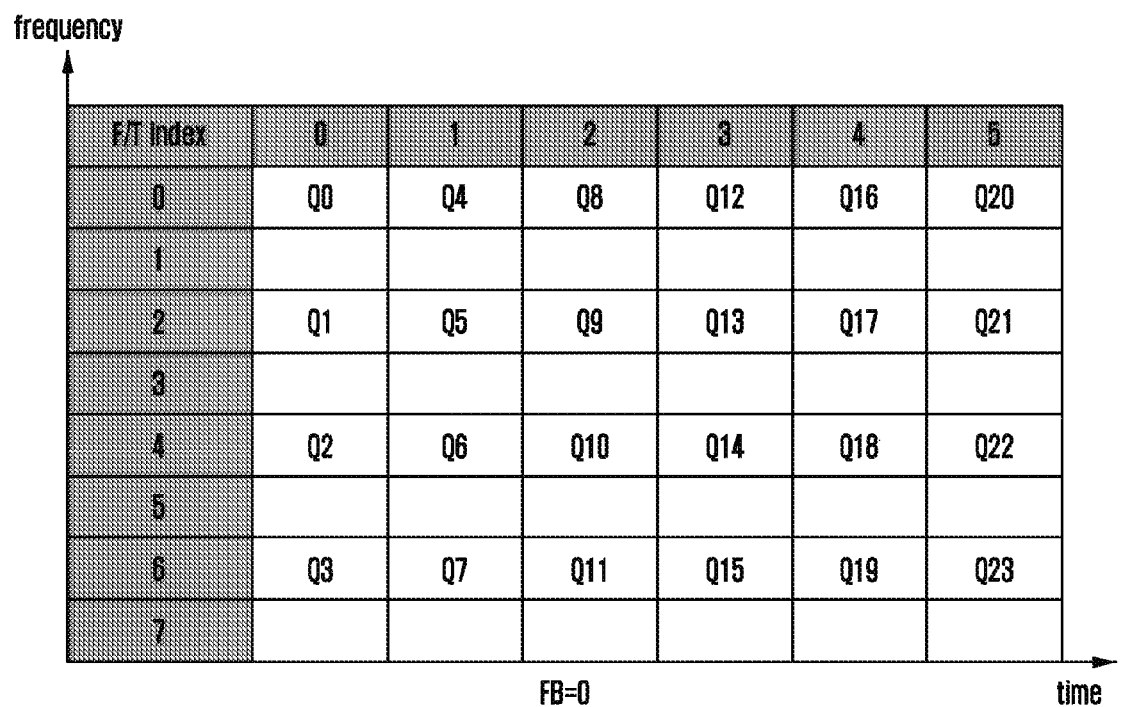
FIGS. 13A and 13B are diagrams illustrating a second type of RB configuration with subcarriers distributed in one filter bank according to an embodiment of the present disclosure.
Figure 13B:
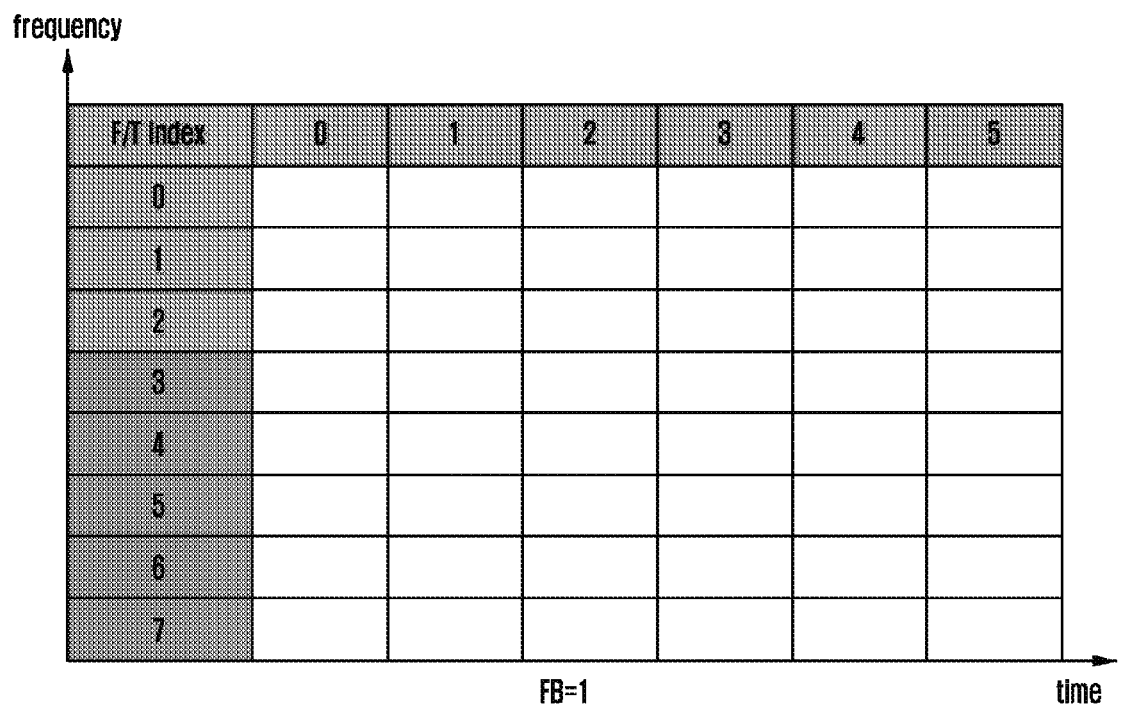

FIGS. 13A and 13B are diagrams illustrating the second type RB configuration with the subcarriers distributed in one filter bank according to an embodiment of the present disclosure.

Referring to FIGS. 13A and 13B, the transmitter may schedule the receiver in such a way of mapping the data symbols to the resource grid (or RB) associated with one filter bank (FIG. 13A) but the resource grids associated with other filter banks (FIG. 13B). According to the second type, the subcarriers to which the data symbols are mapped are not consecutive as shown in FIG. 13A.

Figure 14A:
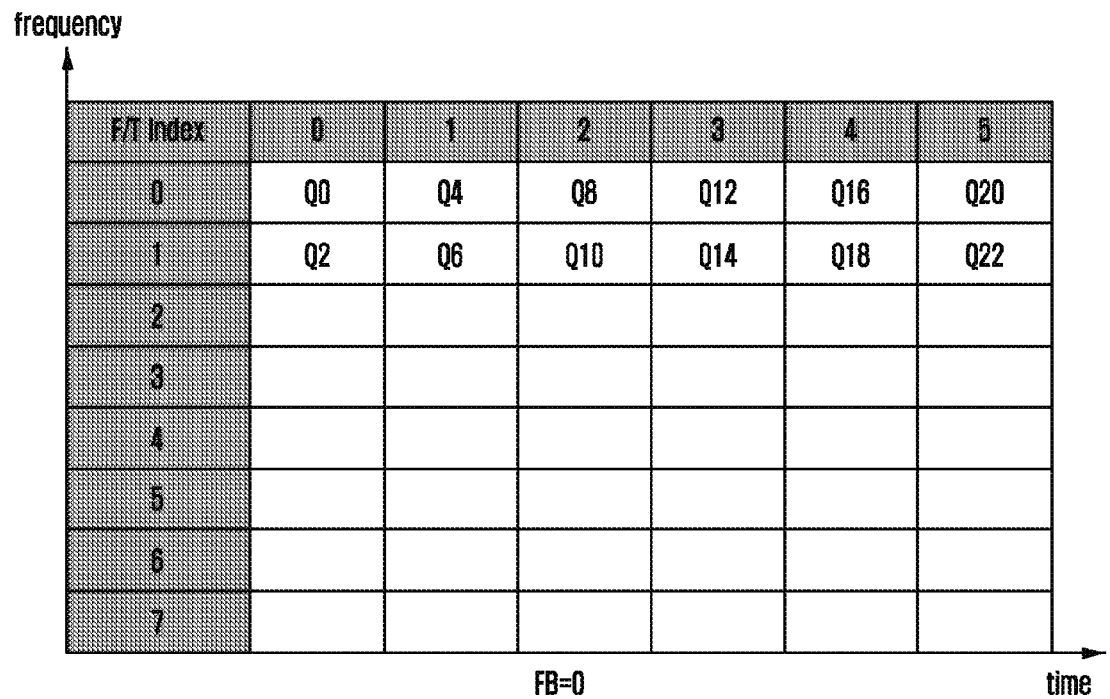
FIGS. 14A and 14B are diagrams illustrating a third type of RB configuration with subcarriers, consecutive across at least two filter banks, according to an embodiment of the present disclosure.
Figure 14B:
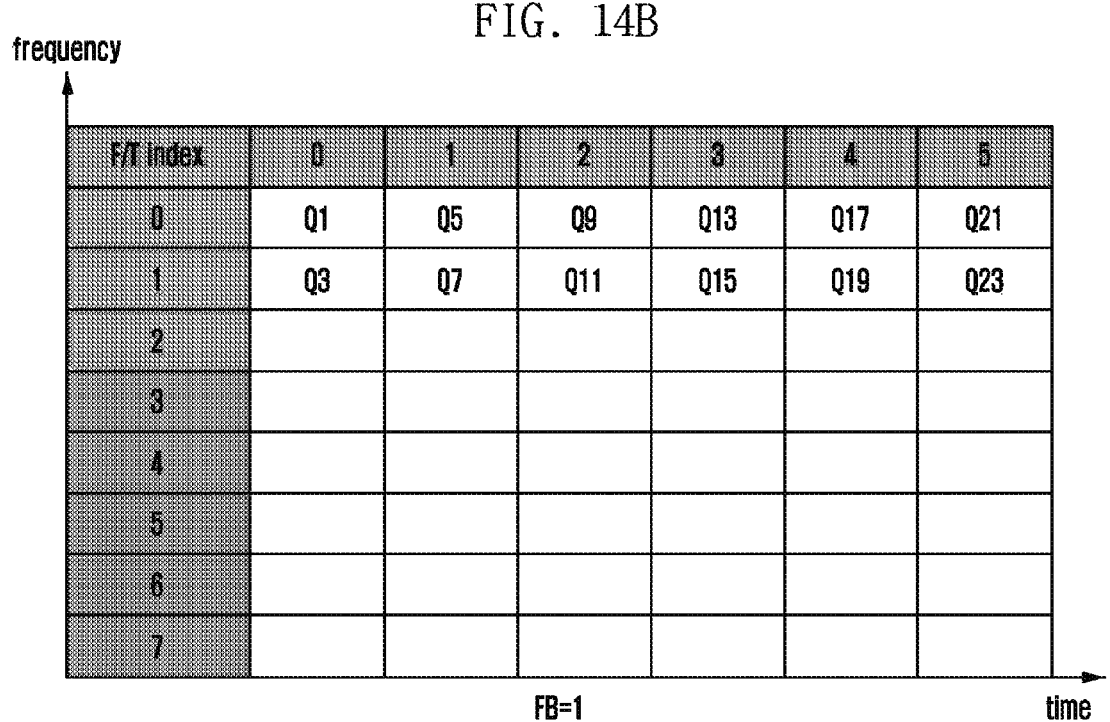

FIGS. 14A and 14B are diagrams illustrating the third type RB configuration with the subcarriers, consecutive across at least two filter banks, according to an embodiment of the present disclosure.

Referring to FIGS. 14A and 14B, the transmitter may schedule the receiver in such a way of mapping the data symbols to the resource grid (or RB) associated with the first bank (FIG. 14A) and the resource grid associated with the second filter bank (FIG. 14B). According to the third type, the subcarriers to which the data symbols are mapped are consecutive.

Figure 15A:
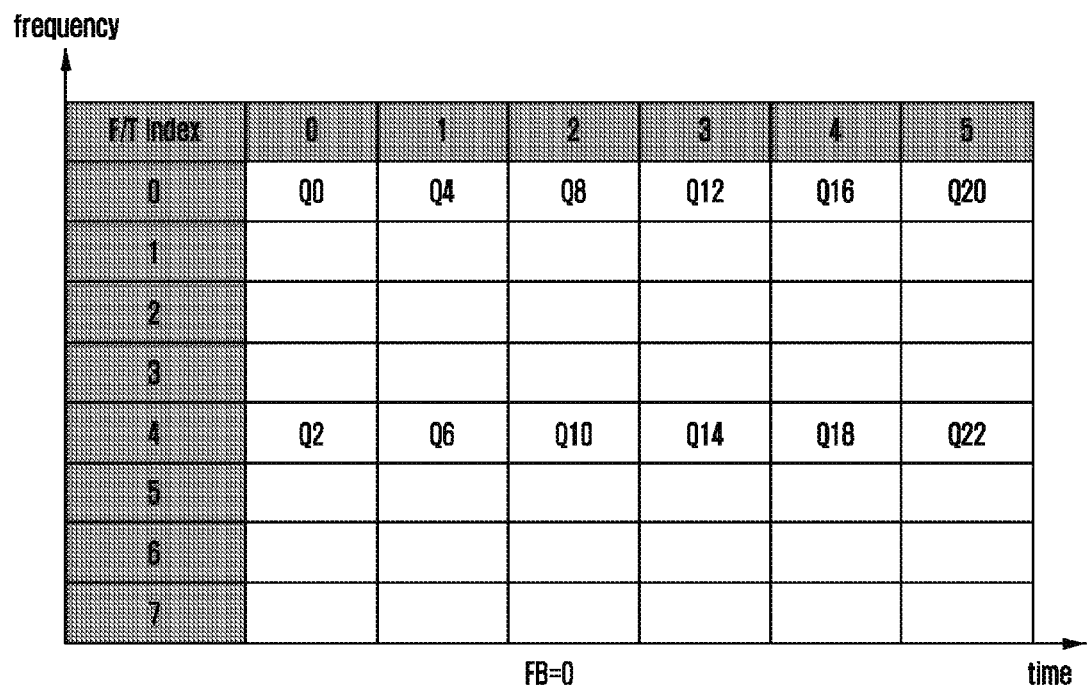
FIGS. 15A and 15B are diagrams illustrating a fourth type of RB configuration with groups of subcarriers distributed across at least two filter banks according to an embodiment of the present disclosure.
Figure 15B:
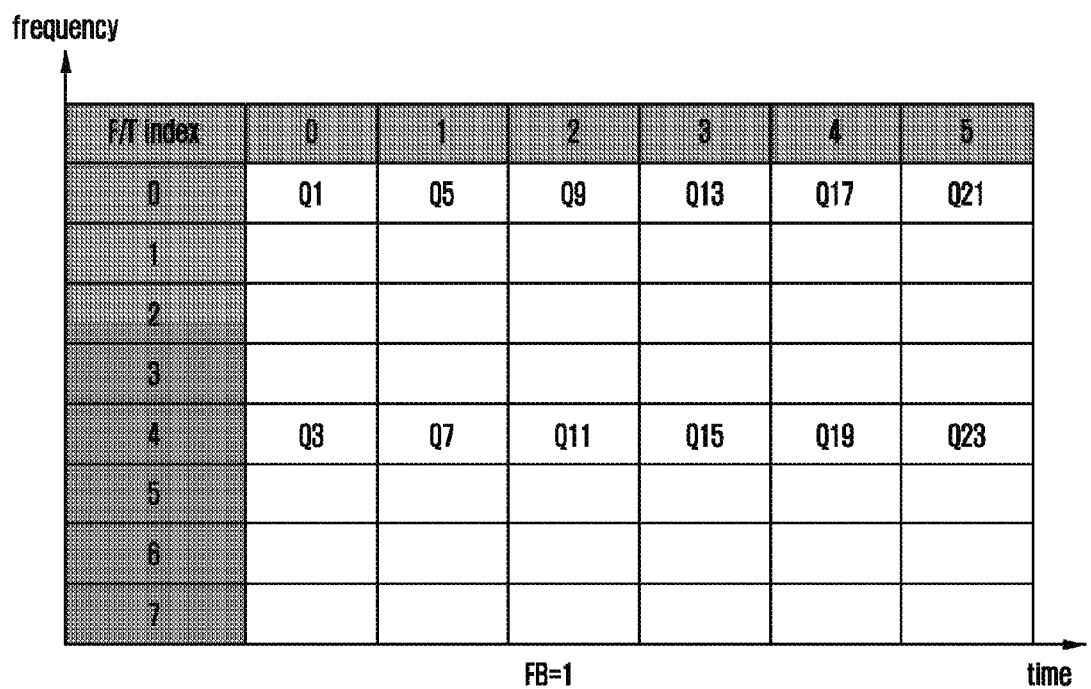

FIGS. 15A and 15B are diagrams illustrating the fourth type RB configuration with groups of subcarriers distributed across at least two filter banks according to an embodiment of the present disclosure.

Referring to FIGS. 15A and 15B, the transmitter may schedule the receiver in such a way of mapping the data symbols to the resource grid (or RB) associated with the first bank (FIG. 15A) and the resource grid associated with the second filter bank (FIG. 15B). According to the fourth type, the subcarriers to which the data symbols are mapped are not consecutive.

Figure 16:
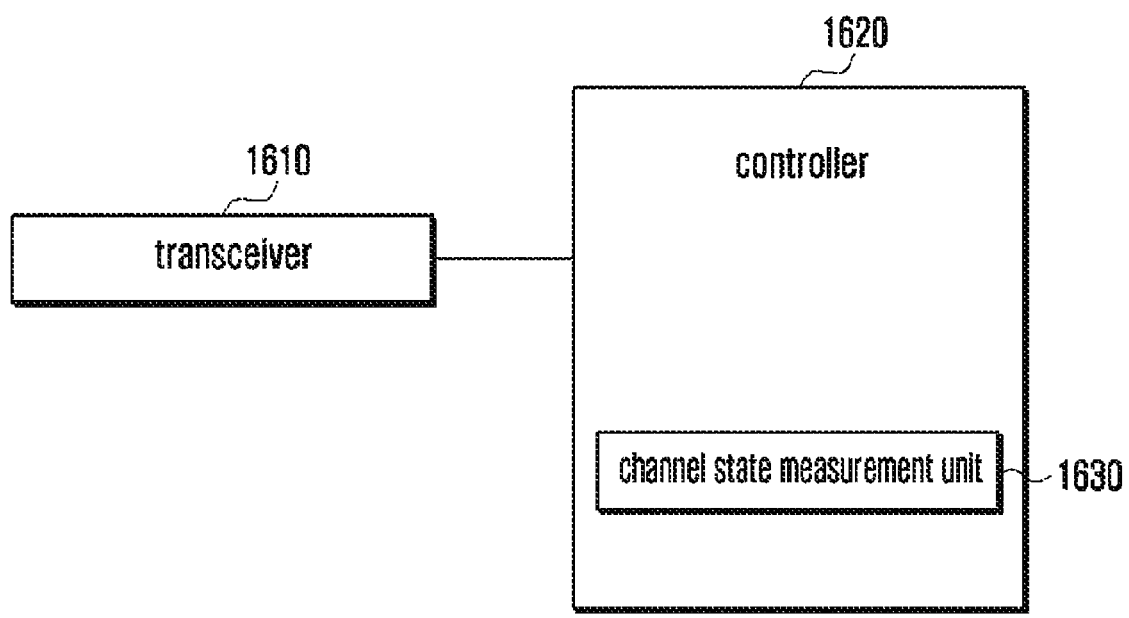
FIG. 16 is a block diagram illustrating a configuration of a receiver according to an embodiment of the present disclosure.

FIG. 16 is a block diagram illustrating a configuration of the receiver according to an embodiment of the present disclosure.

Referring to FIG. 16, the receiver according to an embodiment of the present disclosure includes a transceiver 1610 and a controller 1620.

The transceiver 1610 is responsible for communicating signals with the transmitter. The transceiver 1610 may be configured to transmit/receive QAM symbols with 2 or more base filters for filter band-based radio communication, and such configuration has been described in detail above with reference to FIGS. 1, 2, and 4.

The controller 1620 computes channel state based on the pilot single transmitted from the receiver to the transmitter and controls the process of receiving resource allocation information. For this purpose, the controller may include a channel state measurement unit 1630.

The channel state measurement unit 1630 receives the filter bank information about at least two filter banks from the transmitter and controls the receiver to measure the channel state of the at least two filter banks based on the filter bank information.

In this case, the filter bank information may be carried in the system information or dedicated signal transmitted by the transmitter. The filter bank information may include at least one of, the number of filter banks, number of available frequency resources or nulling resources per filter bank, relationship between logical subcarrier resources and real physical subcarriers in the filter bank, position of pilot signal per filter bank, and resource allocation type.

The channel state measurement unit 1630 may control the receiver to transmit the channel state information generated based on the measurement result to the transmitter.

If the pilot signal is transmitted through the at least two filter banks, the channel state measurement unit 1630 may control the receiver to measure the channel state of each filter bank based on the pilot signal received through the corresponding filter bank. If the pilot signal is transmitted through the first filter bank among the at least two filter banks, the channel state measurement unit 1630 may measure the channel state of the first filter bank based on the pilot signal received through the first filter bank. Next, the channel state measurement unit 1630 may control to recover the channel state between the transmitter and the receiver based on the pilot signal received through the first filter bank and apply the remaining filter banks, with the exception of the first filter bank, to the recovered channel state to measure the channel states of the respective channel states.

The controller 1620 may control the receiver to receive the resource allocation information from the transmitter. In this case, the data symbols indicated by the resource allocation information may be mapped to one of the RBs associated with the at least two filter banks or all of the RBs associated with the at least two filter banks. In this case, the data symbols indicated by the resource allocation information may be mapped to the consecutive subcarriers in the RB or the inconsecutive subcarriers in the RB.

Although the description is directed to a case where the controller 1620 and the channel state measurement unit 1630 are responsible for respective functions, the configuration is not limited thereto. For example, the controller 1620 may be implemented to perform the function of the channel state measurement unit 1630.

Figure 17:
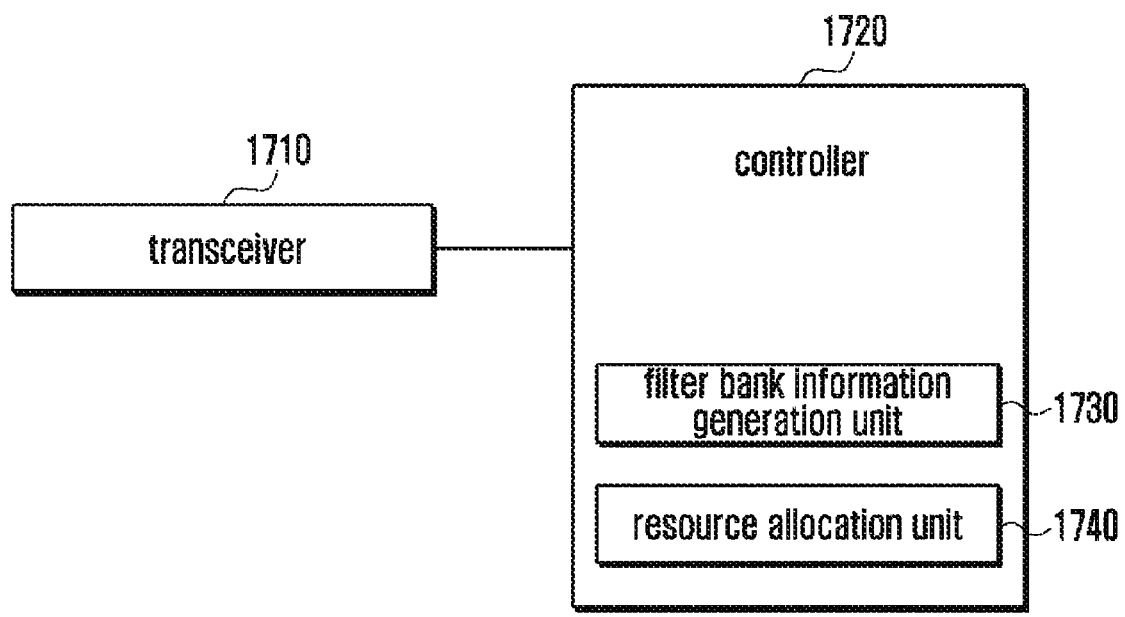
FIG. 17 is a block diagram illustrating a configuration of a transmitter according to an embodiment of the present disclosure.

FIG. 17 is a block diagram illustrating a configuration of the transmitter according to an embodiment of the present disclosure.

Referring to FIG. 17, the transmitter according to an embodiment of the present disclosure includes a transceiver 1710 and a controller 1720.

The transceiver 1710 is responsible for communicating signals with the receiver. The transceiver 1610 may be configured to transmit/receive QAM symbols with 2 or more base filters for filter band-based radio communication, and such configuration has been described in detail above with reference to FIGS. 1, 2, and 4.

The controller 1720 controls the transmitter to transmit the filter bank information, receive the channel state information transmitted by the receiver, and allocates resource to the receiver based on the channel state information. For this purpose, the controller 1720 may include a filter bank information generation unit 1730 and a resource allocation unit 1740.

The filter bank information generation unit 1730 generates the filter bank information including at least one of, the number of filter banks, number of available frequency resources or nulling resources per filter bank, relationship between logical subcarrier resources and real physical subcarriers in the filter bank, position of pilot signal per filter bank, and resource allocation type. The filter bank information generation unit 1730 also may control the transmitter to transmit the filter bank information to the receiver through system information or dedicated signaling.

The resource allocation unit 1740 allocates resources to the receiver based on the channel state information transmitted by the receiver. In this case, the data symbols indicated by the resource allocation information may be mapped to one of the RBs associated with the at least two filter banks or all of the RBs associated with the at least two filter banks. Also, the data symbols indicated by the resource allocation information may be mapped to the consecutive subcarriers in the RB or the inconsecutive subcarriers in the RB.

Although the description is directed to a case where the controller 1720, the filter bank information generation unit 1730, and the resource allocation unit 1740 are responsible for respective functions, the configuration is not limited thereto. For example, the controller 1720 may be implemented to perform the functions of the filter bank information generation unit 1730 and the resource allocation unit 1740.

According to an embodiment of the present disclosure, it is possible to report the channel state effectively and thus to perform per-filter bank resource allocation efficiently in the filter bank-based wireless communication system.

The channel status report-based resource allocation method and apparatus of the present disclosure is advantageous in terms of reducing the reception complexity dramatically by mapping a code-word output from an error correction code encoder to the resources of one filter bank and thus allowing the receiver to operate one filter bank unlike the technology using multiple filter banks.

Also, the channel status report-based resource allocation method and apparatus of the present disclosure is advantageous in terms of improving data transmission efficiency by differentiating valid channels of filter banks and transmitting code-words through the respective filter banks at different MCS levels. Since the error performance such as bit error rate (BER) drops at the resource positions of channels fading severely, it is possible to reduce the error probability by applying the MCS level adaptive to the valid channel condition. This means that it is possible to reduce the data rate loss caused by CQI mismatch through more accurate channel quality measurement. This is more effective when the difference between the per-filter bank self-SIR characteristics is large.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A channel state report method of a receiver in a filter bank-based wireless communication system, the method comprising:
    receiving filter bank information on at least two filter banks from a transmitter;
    measuring a channel state of each of the at least two filter banks based on the filter bank information; and
    transmitting channel state information, which is generated based on the measurement result, to the transmitter.

2. The method of claim 1, wherein the filter bank information comprises at least one of a number of filter banks, a number of available frequency resources or nulling resources per filter bank, a relationship between logical subcarrier resources and real physical subcarriers in each filter bank, a position of a pilot signal per filter bank, and a resource allocation type.

3. The method of claim 1, further comprising receiving resource allocation information from the transmitter,
    wherein data symbols indicated by the resource allocation information are mapped to one of resource blocks (RBs) associated with the at least two filter banks or all of the RBs associated with the at least two filter banks,
    wherein the filter bank information is received from the transmitter through system information or dedicated signaling,
    wherein the data symbols indicated by the resource allocation information are mapped to subcarriers, consecutive or inconsecutive, in each RB.

4. The method of claim 1, wherein the at least two filter banks comprise a first filter bank and a second filter bank that are associated with one of a plurality of resource block (RB) types including a first RB type associated with the first filter bank, a second RB type associated with the second filter bank, and a third RB type associated with both the first and second filter banks.

5. The method of claim 1, wherein the measuring of the channel state comprises measuring, when a pilot signal is transmitted through all of the at least two filter banks, measuring the channel state of respective filter banks based on the pilot signal received through the respective filter banks.

6. The method of claim 1, wherein the measuring of the channel state comprises:
    measuring, when a pilot signal is received through a first filter bank of the at least two filter banks, the channel state of the first filter bank based on the pilot signal received through the first filter bank;
    recovering the channel information between the transmitter and the receiver based on the pilot signal received through the first filter bank; and
    measuring the channel state of each of the respective filter banks by applying the recovered channel information to the remaining filter banks other than the first filter bank.

7. A channel state information reception and resource allocation method of a transmitter in a filter bank-based wireless communication system, the method comprising:
    transmitting filter bank information on at least two filter banks to at least one receiver;
    receiving channel state information measured based on the filter bank information from the receiver; and
    transmitting resource allocation information generated based on the channel state information to the receiver.

8. The method of claim 7, wherein data symbols indicated by the resource allocation information are mapped to one of resource blocks (RBs) associated with the at least two filter banks or all of the RBs associated with the at least two filter banks, wherein the filter bank information is transmitted to the receiver through system information or dedicated signaling, and wherein the data symbols indicated by the resource allocation information are mapped to subcarriers, consecutive or inconsecutive, in each RB.

9. The method of claim 8, wherein the filter bank information comprises at least one of a number of filter banks, a number of available frequency resources or nulling resources per filter bank, a relationship between logical subcarrier resources and real physical subcarriers in each filter bank, a position of a pilot signal per filter bank, and a resource allocation type.

10. The method of claim 7, wherein the at least two filter banks comprise a first filter bank and a second filter bank that are associated with one of a plurality of resource block (RB) types including a first RB type associated with the first filter bank, a second RB type associated with the second filter bank, and a third RB type associated with both the first and second filter banks.

11. The method of claim 7, wherein a channel state of each of the at least two filter banks are measured based on a pilot signal received through respective filter banks when the pilot signal is transmitted through all of the at least two filter banks.

12. The method of claim 7, wherein a channel state of a first filter bank of the at least two filter banks is measured based on a pilot signal received through the first filter bank, and the channel state of remaining filter banks other than the first filter bank, is measured by recovering the channel information between the transmitter and the receiver based on the pilot signal received through the first filter bank and applying the remaining filter banks, excluding the first filter bank, to the recovered channel information.

13. A receiver which reports a channel state in a filter bank-based wireless communication system, the receiver comprising:
a transceiver configured to transmit and receive signals to and from a transmitter; and
a controller configured to control to:
receive filter bank information on at least two filter banks from a transmitter,
measure a channel state of each of the at least two filter banks based on the filter bank information, and
transmitting channel state information, which is generated based on the measurement result, to the transmitter.

14. The receiver of claim 13, wherein the filter bank information comprises at least one of a number of filter banks, a number of available frequency resources or nulling resources per filter bank, a relationship between logical subcarrier resources and real physical subcarriers in each filter bank, a position of a pilot signal per filter bank, and a resource allocation type.

15. The receiver of claim 13, wherein the controller is further configured to control to receive resource allocation information from the transmitter, and
wherein data symbols indicated by the resource allocation information are mapped to one of resource blocks (RBs) associated with the at least two filter banks or all of the RBs associated with the at least two filter banks,
wherein the filter bank information is received from the transmitter through system information or dedicated signaling,
wherein the data symbols indicated by the resource allocation information are mapped to subcarriers, consecutive or inconsecutive, in each RB.

16. The receiver of claim 13, wherein the at least two filter banks comprises a first filter bank and a second filter bank that are associated with one of a plurality of resource block (RB) types including a first RB type associated with the first filter bank, a second RB type associated with the second filter bank, and a third RB type associated with both the first and second filter banks.

17. The receiver of claim 13, wherein the controller is further configured to control to measure, when a pilot signal is transmitted through all of the at least two filter banks, measuring the channel state of respective filter banks based on the pilot signal received through the respective filter banks.

18. The receiver of claim 13, wherein the controller is further configured to control to:
measure, when a pilot signal is received through a first filter bank of the at least two filter banks, the channel state of the first filter bank based on the pilot signal received through the first filter bank,
recover the channel information between the transmitter and the receiver based on the pilot signal received through the first filter bank, and
measure the channel state of each of the respective filter banks by applying the recovered channel information to the remaining filter banks other than the first filter bank.

19. A transmitter which allocates resources based on channel state information in a filter bank-based wireless communication system, the transmitter comprising:
a transceiver configured to transmit and receive signals to and from a receiver; and
a controller configured to control to:
transmit filter bank information on at least two filter banks to at least one receiver,
receive channel state information measured based on the filter bank information from the receiver, and
transmit resource allocation information generated based on the channel state information to the receiver.

20. The transmitter of claim 19, wherein the filter bank information comprises at least one of a number of filter banks, a number of available frequency resources or nulling resources per filter bank, a relationship between logical subcarrier resources and real physical subcarriers in each filter bank, a position of pilot signal per filter bank, and a resource allocation type.

21. The transmitter of claim 19, wherein data symbols indicated by the resource allocation information are mapped to one of resource blocks (RBs) associated with the at least two filter banks or all of the RBs associated with the at least two filter banks,
wherein the filter bank information is transmitted to the receiver through system information or dedicated signaling, and
wherein the data symbols indicated by the resource allocation information are mapped to subcarriers, consecutive or inconsecutive, in each RB.

22. The transmitter of claim 19, wherein the at least two filter banks comprise a first filter bank and a second filter bank that are associated with one of a plurality of resource block (RB) types including a first RB type associated with the first filter bank, a second RB type associated with the second filter bank, and a third RB type associated with both the first and second filter banks.

23. The transmitter of claim 19, wherein a channel state of each of the at least two filter banks are measured based on a pilot signal received through respective filter banks when the pilot signal is transmitted through all of the at least two filter banks.

24. The transmitter of claim 19, wherein a channel state of a first filter bank of the at least two filter banks is measured based on a pilot signal received through the first filter bank, and the channel state of remaining filter banks other than the first filter bank is measured by recovering the channel information between the transmitter and the receiver based on the pilot signal received through the first filter bank and applying the remaining filter banks, excluding the first filter bank, to the recovered channel information.

* * * * *